US012806719B2

(12) United States Patent
Kawasuji et al.

(10) Patent No.: US 12,806,719 B2
(45) Date of Patent: Nov. 24, 2026

(54) GLASS PROCESSING METHOD

(71) Applicant: Gigaphoton Inc., Tochigi (JP)

(72) Inventors: Yasufumi Kawasuji, Oyama (JP); Akira Suwa, Oyama (JP); Yasuhiro Adachi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 898 days.

(21) Appl. No.: 18/180,495

(22) Filed: Mar. 8, 2023

(65) Prior Publication Data

US 2023/0219171 A1 Jul. 13, 2023

Related U.S. Application Data

(63) Continuation of application No. PCT/JP2020/038617, filed on Oct. 13, 2020.

(51) Int. Cl.
*B23K 26/382* (2014.01)
*B23K 26/0622* (2014.01)
(Continued)

(52) U.S. Cl.
CPC ........ *B23K 26/382* (2015.10); *B23K 26/0622* (2015.10); *B23K 26/402* (2013.01); (Continued)

(58) Field of Classification Search
CPC ............ B23K 26/0622; B23K 2103/54; B23K 26/382; B23K 26/402; B23K 26/034; B23K 2103/50; B23K 26/02; B23K 26/046; B23K 26/0643; B23K 26/08; B23K 26/359; B23K 26/361; B23K 26/53; G02F 1/354; B24B 37/00; B24B 9/10; B24D 13/18; B24D 9/00; B24D 9/02; C03B 33/0222; C03B 33/082; C03B 33/033
USPC .............. 428/131, 34.4; 216/55; 219/121.61, 219/121.62, 121.68, 121.7, 121.71; 65/105, 112
See application file for complete search history.

(56) References Cited

U.S. PATENT DOCUMENTS

| | | | |
|---|---|---|---|
| 6,067,311 | A | 5/2000 | Morton et al. |
| 2010/0276404 | A1 | 11/2010 | Fukuhara et al. |

(Continued)

FOREIGN PATENT DOCUMENTS

| | | | |
|---|---|---|---|
| CN | 101811227 | A | 8/2010 |
| CN | 109564857 | A | 4/2019 |

(Continued)

OTHER PUBLICATIONS

International Search Report issued in PCT/JP2020/038617; mailed Dec. 8, 2020.

(Continued)

*Primary Examiner* — Vy T Nguyen

(74) *Attorney, Agent, or Firm* — Studebaker Brackett PLLC

(57) ABSTRACT

A glass processing method according to a viewpoint of the present disclosure includes generating a pulse laser beam by using a laser oscillator, and irradiating alkali-free glass to be processed with the pulse laser beam. The wavelength of the pulse laser beam ranges from 248 nm to 266 nm, and the pulse laser beam has an energy ratio greater than or equal to 91% but smaller than or equal to 99% in the region from 5 ns after a pulse rises to 400 ns.

5 Claims, 23 Drawing Sheets

(51) Int. Cl.

| | |
|---|---|
| ***B23K 26/402*** | (2014.01) |
| ***B23K 103/00*** | (2006.01) |
| ***C03B 33/08*** | (2006.01) |
| ***G02F 1/35*** | (2006.01) |
| ***H01S 3/00*** | (2006.01) |
| ***H01S 3/109*** | (2006.01) |
| ***H01S 3/225*** | (2006.01) |

(52) U.S. Cl.
CPC ............ *C03B 33/082* (2013.01); *G02F 1/354* (2021.01); *H01S 3/0057* (2013.01); *H01S 3/109* (2013.01); *H01S 3/2256* (2013.01); *B23K 2103/54* (2018.08)

(56) References Cited

U.S. PATENT DOCUMENTS

| | | | | |
|---|---|---|---|---|
| 2011/0298156 | A1 | 12/2011 | Hooper et al. | |
| 2017/0365475 | A1 | 12/2017 | Ohkubo et al. | |
| 2018/0019141 | A1* | 1/2018 | Ohkubo | H10P 72/0436 |
| 2019/0103724 | A1 | 4/2019 | Onose et al. | |
| 2019/0157120 | A1 | 5/2019 | Tanaka et al. | |
| 2020/0209760 | A1 | 7/2020 | Kakizaki et al. | |
| 2020/0353567 | A1* | 11/2020 | Matsuo | C03B 33/09 |

FOREIGN PATENT DOCUMENTS

| | | | |
|---|---|---|---|
| CN | 111148596 | A | 5/2020 |
| EP | 0984531 | A2 | 3/2000 |
| JP | 2000-091684 | A | 3/2000 |
| JP | 2000-511113 | A | 8/2000 |
| JP | 2007-175721 | A | 7/2007 |
| JP | 2010-274328 | A | 12/2010 |
| JP | 2014-514754 | A | 6/2014 |
| WO | 97/44155 | A1 | 11/1997 |
| WO | 2016/151723 | A1 | 9/2016 |

OTHER PUBLICATIONS

International Preliminary Report On Patentability and Written Opinion issued in PCT/JP2020/038617; issued Apr. 13, 2023.

An Office Action mailed by China National Intellectual Property Administration on Apr. 11, 2025, which corresponds to Chinese Patent Application No. 202080103700.7 and is related to U.S. Appl. No. 18/180,495, with English language translation.

An Office Action mailed by China National Intellectual Property Administration on Sep. 26, 2025, which corresponds to Chinese Patent Application No. 202080103700.7 and is related to U.S. Appl. No. 18/180,495, with English language translation.

* cited by examiner

FIG. 14

| Configuration | OPS-R | TIS | 5ns-400ns ENERGY RATIO |
|---|---|---|---|
| NO OPS | – | 32ns | 86% |
| 7m | 60% | 74ns | 95% |
| 14m | 60% | 97ns | 95% |
| 21m | 60% | 97ns | 95% |

FIG. 15

| Configuration | OPS-R | TIS | 5ns-400ns ENERGY RATIO |
|---|---|---|---|
| NO OPS | – | 32ns | 86% |
| 7m | 40% | 62ns | 91% |
| 7m | 60% | 74ns | 95% |
| 7m | 90% | 43ns | 99% |

*FIG. 19*

| Configuration | TIS | 5ns–400ns ENERGY RATIO |
|---|---|---|
| NO OPS | 32ns | 86% |
| ONE OPS 7m | 74ns | 95% |
| TWO OPSES 7m+14m | 155ns | 98% |
| THREE OPSES 7m+14m+21m | 259ns | 99% |

GLASS PROCESSING METHOD

CROSS-REFERENCE TO RELATED APPLICATIONS

The present application is a continuation application of International Application No. PCT/JP2020/038617, filed on Oct. 13, 2020, the entire contents of which are hereby incorporated by reference.

BACKGROUND

1. Technical Field

The present disclosure relates to a glass processing method.

2. Related Art

In recent years, a semiconductor exposure apparatus is required to improve the resolution thereof as semiconductor integrated circuits are increasingly miniaturized and highly integrated. To this end, reduction in the wavelength of light outputted from a light source for exposure is underway. For example, a KrF excimer laser apparatus, which outputs a laser beam having a wavelength of about 248 nm, and an ArF excimer laser apparatus, which outputs a laser beam having a wavelength of about 193 nm, are used as a gas laser apparatus for exposure.

As a method for processing glass to form a microscopic hole, there is, for example, a method for creating an altered portion with a femtosecond or ultraviolet laser and utilizing the fact that the etching rate in the altered section is greater than that in the other portion, and a method for directly processing glass with an excimer laser apparatus.

CITATION LIST

Patent Literature

[PTL 1] JPA2000-511113
[PTL 2] JPA2010-274328
[PTL 3] JPA2007-175721
[PTL 4] WO2016/151723

SUMMARY

A glass processing method according to a viewpoint of the present disclosure includes generating a pulse laser beam by using a laser oscillator, and irradiating alkali-free glass to be processed with the pulse laser beam. A wavelength of the pulse laser beam ranges from 248 nm to 266 nm, and the pulse laser beam has an energy ratio greater than or equal to 91% but smaller than or equal to 99% in a region from 5 ns after a pulse rises to 400 ns.

A glass processing method according to another viewpoint of the present disclosure includes generating a first pulse laser beam having a wavelength ranging from 248 nm to 266 nm by using a laser oscillator, generating a second pulse laser beam having an energy ratio greater than or equal to 91% but smaller than or equal to 99% in a region from 5 ns after a pulse rises to 400 ns by using an optical pulse stretcher disposed in an optical path of the first pulse laser beam to stretch a pulse width of the first pulse laser beam, and irradiating alkali-free glass to be processed with the second pulse laser beam.

A glass processing method according to still another viewpoint of the present disclosure includes generating a plurality of pulse laser beams each having a wavelength ranging from 248 nm to 266 nm by using a plurality of laser oscillators at different timings, generating a combined pulse laser beam having an energy ratio greater than or equal to 91% but smaller than or equal to 99% in a region from 5 ns after a pulse rises to 400 ns by using a propagation optical system configured to parallelize optical path axes of the plurality of pulse laser beams to combine the plurality of pulse laser beams with one another, and irradiating alkali-free glass as an object to be processed with the combined pulse laser beam.

BRIEF DESCRIPTION OF THE DRAWINGS

Embodiments of the present disclosure will be described below only by way of example with reference to the accompanying drawings.

FIG. 14 is a table that summarizes the relationship between the OPS circulation distance, TIS of the outputted pulse laser beam, and an energy ratio in the region from 5 ns after a pulse rises to 400 ns.

FIG. 15 is a table showing the result of calculation of TIS of the pulse laser beam outputted when the reflectance of a beam splitter in the OPS is changed, and the energy ratio in the region from 5 ns after a pulse rises to 400 ns.

FIG. 19 is a table showing TIS of the pulse laser beam outputted when the number of OPSes is changed and the result of calculation of the energy ratio in the region from 5 ns after a pulse rises to 400 ns.

DETAILED DESCRIPTION

Contents

Figure 1:
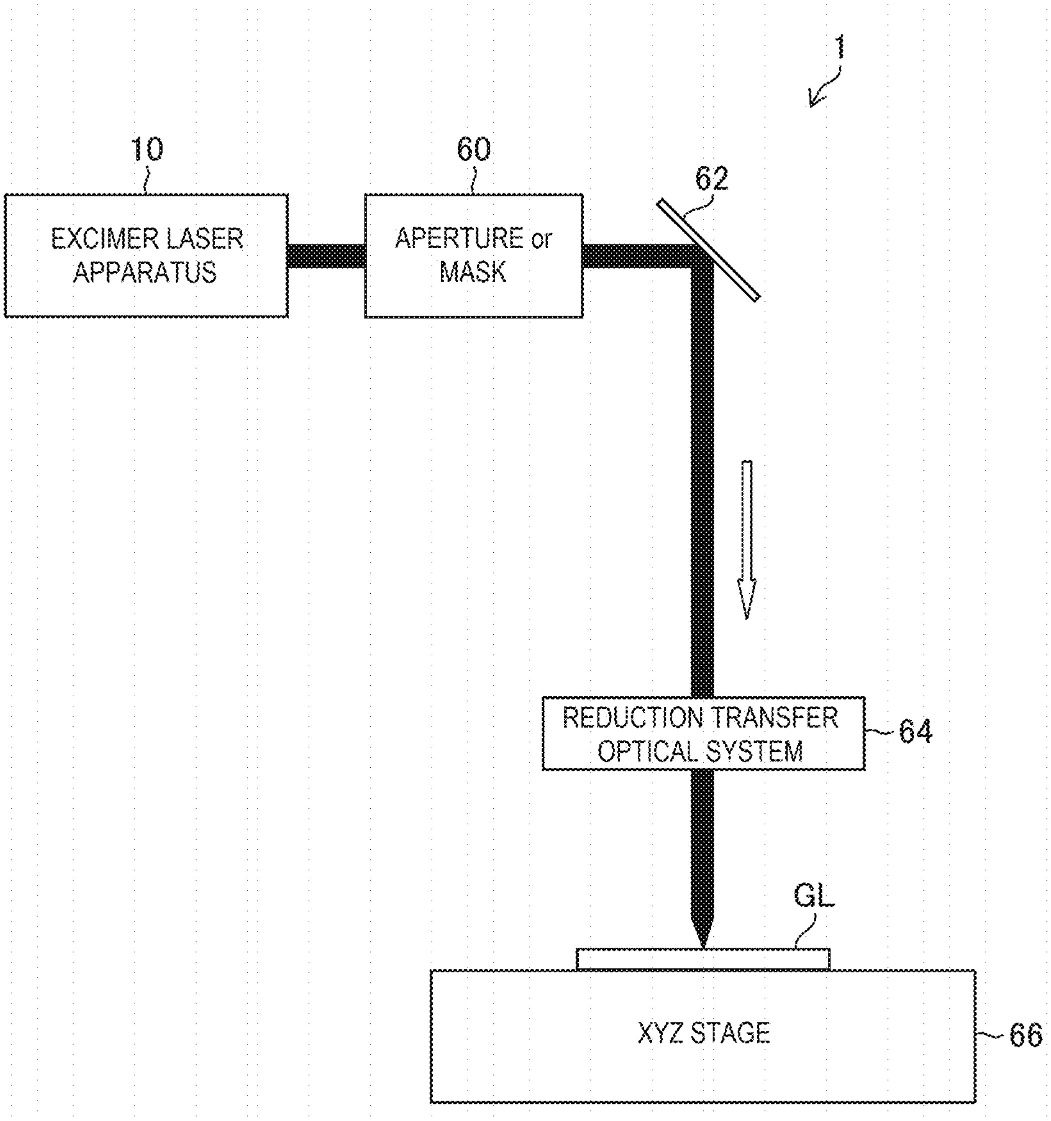
FIG. 1 schematically shows an example of the configuration of a laser processing system used to drill a glass object.

1. Description of terms
2. Overview of laser processing system
3. Description of excimer laser apparatus according to Comparative Example
3.1 Configuration
3.2 Operation
3.3 Problems
4. First Embodiment
4.1 Configuration
4.2 Operation
4.3 Factors contributing to high processing rate achieved by pulse laser beam having long pulses
4.4 Relationship between OPS circulation distance and TIS
4.5 Relationship between reflectance of beam splitter in OPS and TIS
4.6 Effects
4.7 Variations
5. Second Embodiment
5.1 Configuration
5.2 Operation
5.3 Relationship between the number of OPSes, pulse waveform, and TIS
5.4 Effects
6. Third Embodiment
6.1 Configuration
6.2 Operation
6.3 Effects
7. Fourth Embodiment
7.1 Configuration
7.2 Operation
7.3 Effects
8. Example of preferable conditions for pulse laser beam
9. Wavelength of pulse laser beam
10. Hardware configuration of laser controller
11. Others Embodiments of the present disclosure will be described below in detail with reference to the drawings. The embodiments described below show some examples of the present disclosure and are not intended to limit the contents of the present disclosure. Furthermore, all configurations and operations described in the embodiments are not necessarily essential as configurations and operations in the present disclosure. The same component has the same reference character, and no redundant description of the same component will be made.

1. Description of Terms

"TIS" stands for an indicator of the pulse width of a pulse laser beam and is expressed by Expression (1) below.

$$TIS=[\int I(t)dt]^2/\int I(t)^2dt \quad (1)$$

The term I(t) in Expression (1) is a time function of the optical intensity (intensity) of the pulse laser beam.

That is, let I(t) be the optical intensity of the temporal waveform of the pulse laser beam at time t, and TIS is the pulse width defined by Expression (1). TIS is known as a method for defining the pulse width of a time function, of the intensity, that is a non-rectangular wave. TIS may be referred, for example, to as a "TIS pulse time width" or a "TIS width".

2. Overview of Laser Processing System

FIG. 1 schematically shows an example of a laser processing system 1 used to directly process a glass object GL to form a microscopic hole with an excimer laser apparatus 10. The laser processing system 1 includes the excimer laser apparatus 10, an aperture or mask 60, a mirror 62, a reduction transfer optical system 64, and an XYZ stage 66.

The glass object GL as a processing target (workpiece) is placed on the XYZ stage 66. The XYZ stage 66 is a stage provided with an actuator and movable in the directions of three axes perpendicular to one another, an axis-X direction, an axis-Y direction, and an axis-Z direction. The excimer laser apparatus 10 is, for example, a KrF excimer laser that outputs a laser beam having a wavelength of 248 nm and an ArF excimer laser that outputs a laser beam having a wavelength of 193 nm.

The laser processing system 1 irradiates the aperture or mask 60 with a pulse laser beam outputted from the excimer laser apparatus 10 and forms an image of the aperture or mask 60 at the glass object GL via the reduction transfer optical system 64 to process the glass object GL. The thus configured laser processing system 1 allows simultaneous formation of a plurality of microscopic holes. In place of the configuration shown in FIG. 1, there is another method for focusing a pulse laser beam via a focusing lens and irradiating a target object to be drilled with the focused laser beam to form a hole.

3. Description of Excimer Laser Apparatus According to Comparative Example

3.1 Configuration

Figure 2:
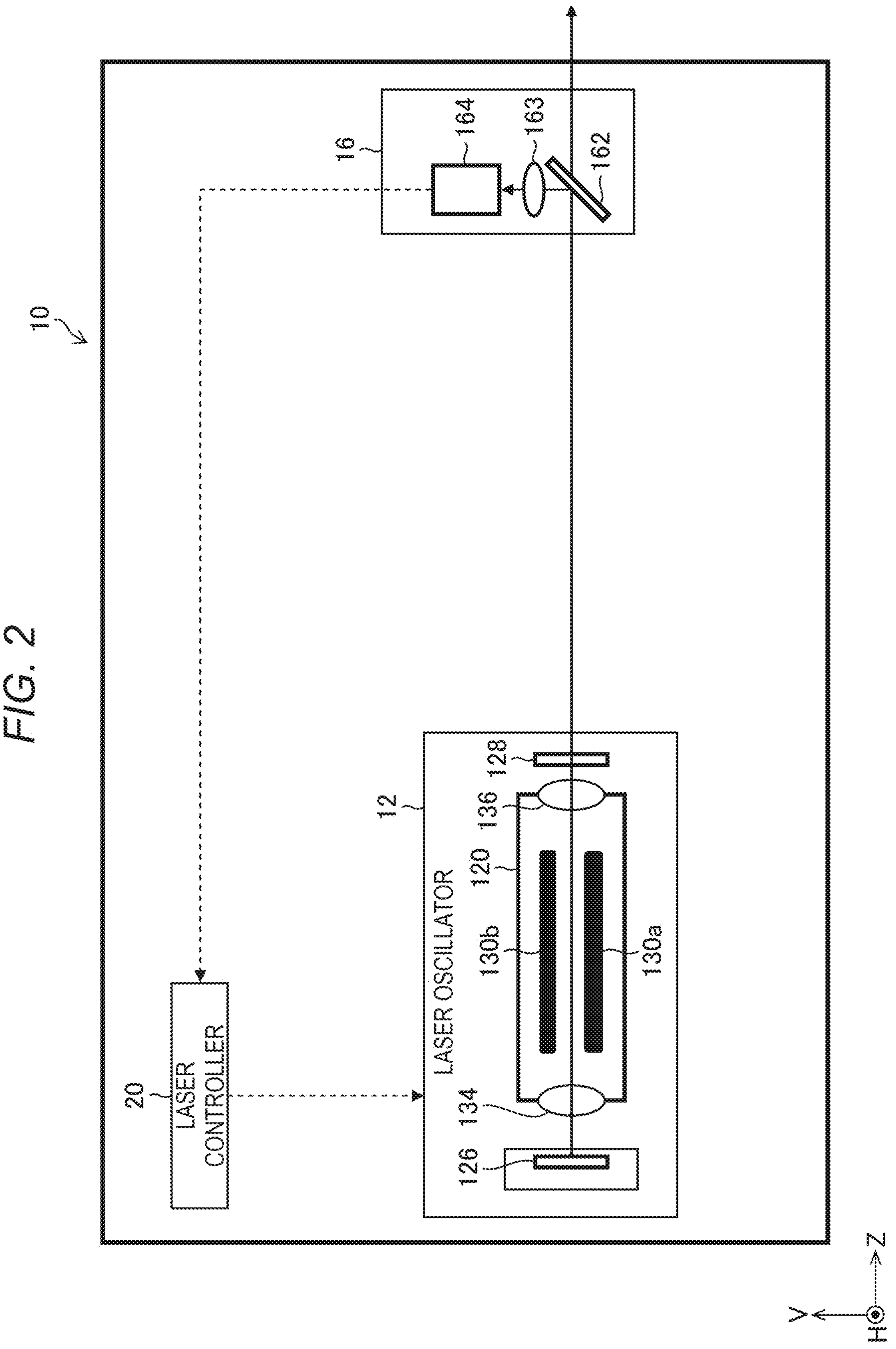
FIG. 2 schematically shows the configuration of an excimer laser apparatus according to Comparative Example.

FIG. 2 schematically shows the configuration of the excimer laser apparatus 10 according to Comparative Example. Comparative Example in the present disclosure is an aspect that the applicant is aware of as known only by the applicant, and is not a publicly known example that the applicant is self-aware of.

The excimer laser apparatus 10 includes a laser oscillator 12, a monitor module 16, and a laser controller 20. The laser oscillator 12 includes a chamber 120, a rear mirror 126, and an output coupling mirror 128. The output coupling mirror 128 may, for example, be a partially reflective mirror having a reflectance ranging from 8% to 15%. The output coupling mirror 128 and the rear mirror 126 are arranged so as to constitute an optical resonator.

The chamber 120 is disposed in the optical path of the optical resonator. The chamber 120 includes a pair of electrodes 130*a* and 130*b*, and two windows 134 and 136, which transmit the laser beam. An excimer laser gas is supplied into the chamber 120 from a gas supply source that is not shown. The excimer laser gas contains, for example, a rare gas, a halogen gas, and a buffer gas. The rare gas may, for example, be an Ar or Kr gas. The halogen gas may, for example, be an $F_2$ gas, and the buffer gas may, for example, be an Ne gas.

The monitor module 16 is disposed in the optical path of the pulse laser beam outputted from the laser oscillator 12. The monitor module 16 includes a beam splitter 162, a condenser lens 163, and a photosensor 164.

The beam splitter 162 is disposed in the optical path of the pulse laser beam. The beam splitter 162, the condenser lens 163 and the photosensor 164 are so disposed that the light reflected off the beam splitter 162 is incident on the photosensor 164 via the condenser lens 163.

The photosensor 164 is so disposed that a light receiver of the photosensor 164 is located at the focal point of the condenser lens 163. The photosensor 164 may, for example, be a photodiode or a bi-plane-structured photoelectric tube that responds at high speed.

3.2 Operation

When discharge occurs between the electrodes 130*a* and 130*b* in the chamber 120, the excimer laser gas is excited, and a pulse laser beam amplified by the optical resonator including the output coupling mirror 128 and the rear mirror 126 is outputted via the output coupling mirror 128.

Part of the pulse laser beam outputted from the laser oscillator 12 is reflected off the beam splitter 162 in the monitor module 16 and incident on the photosensor 164 via the condenser lens 163.

The laser controller 20 receives a signal from the photosensor 164 and integrates the pulse temporal waveform carried by the signal to calculate the pulse energy.

The laser controller 20 controls the voltage applied to the space between the electrodes 130*a* and 130*b* in the laser oscillator 12 in such a way that the pulse energy measured with the photosensor 164 is equal to target pulse energy.

3.3 Problems

The method for directly processing glass to form a microscopic hole with an excimer laser has a problem of a low processing rate (processability) and hence a high processing cost.

4. First Embodiment

4.1 Configuration

Figure 3:
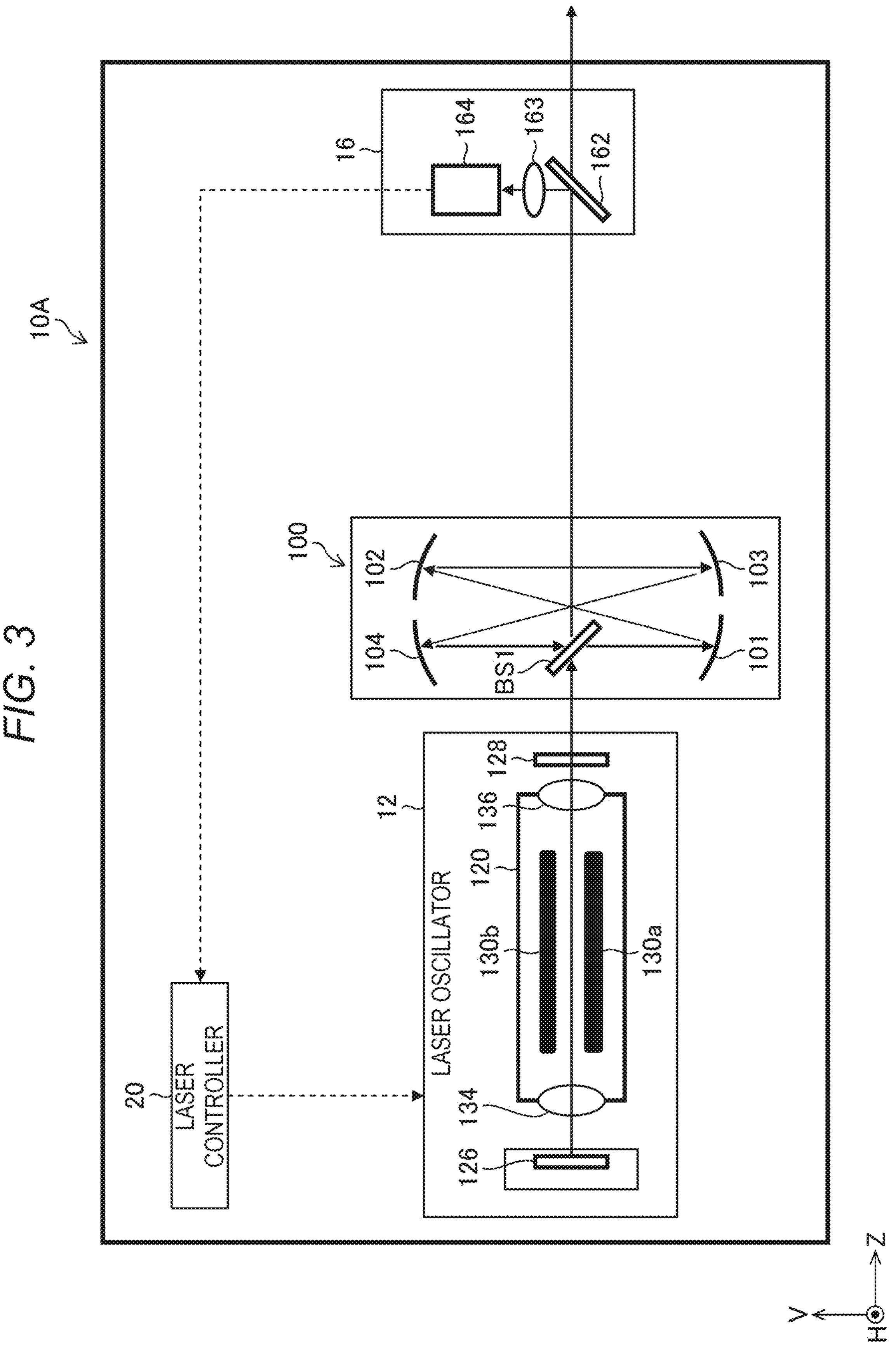
FIG. 3 schematically shows the configuration of an excimer laser apparatus used in a glass processing method according to a first embodiment.

FIG. 3 schematically shows the configuration of an excimer laser apparatus 10A used in the glass processing method according to a first embodiment. Differences in configuration between FIGS. 3 and 2 will be described. The excimer laser apparatus 10A is a KrF excimer laser apparatus including an optical pulse stretcher (OPS) 100 in the optical path between the laser oscillator 12 and the monitor module 16. The OPS 100 is so disposed that the pulse laser beam outputted via the output coupling mirror 128 enters the OPS 100.

The OPS 100 includes a beam splitter BS1 and four concave mirrors 101, 102, 103, and 104. The other configurations may be the same as those in FIG. 2.

Figure 4:
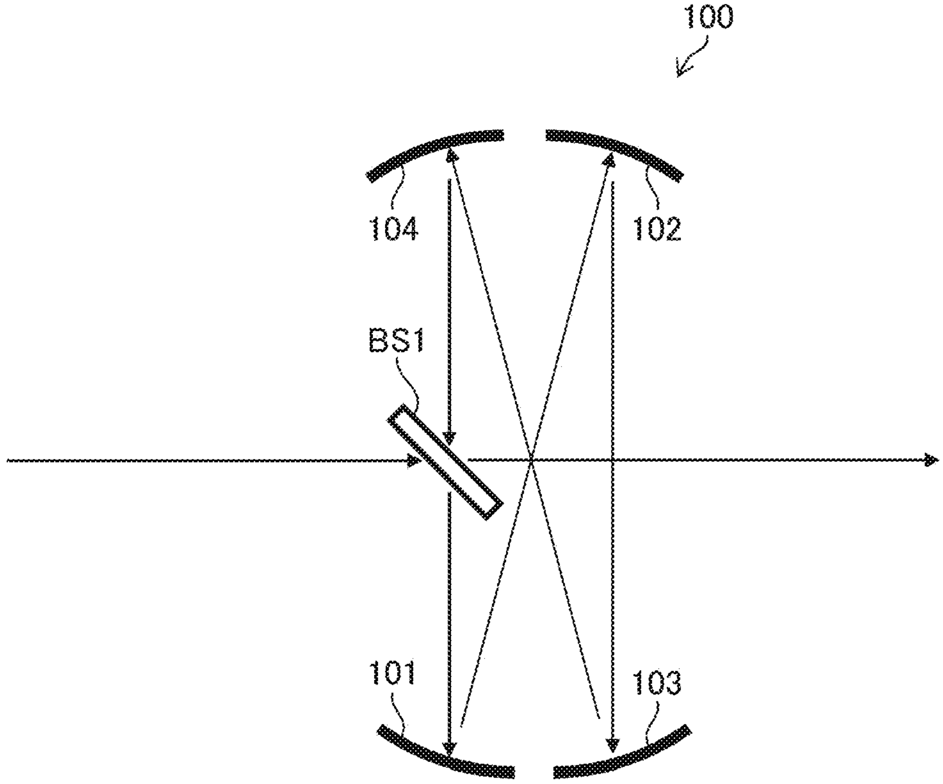
FIG. 4 schematically shows the configuration of an optical pulse stretcher (OPS).

FIG. 4 schematically shows the configuration of the OPS 100. The beam splitter BS1 is disposed in the optical path of the pulse laser beam outputted via the output coupling mirror 128 of the laser oscillator 12. The beam splitter BS1 is a partially reflective mirror that transmits part of the pulse laser beam incident thereon and reflects the other part of the pulse laser beam. The reflectance of the beam splitter BS1 preferably ranges from 40% to 70%, and is more preferably about 60%.

The concave mirrors 101, 102, 103, and 104 constitute an optical delay path of the pulse laser beam reflected off a first surface of the beam splitter BS1. The four concave mirrors 101 to 104 may be concave mirrors having substantially the same focal lengths. A focal length f of each of the concave mirrors 101 to 104 may correspond, for example, to the distance from the beam splitter BS1 to the concave mirror 101.

The concave mirror 101 is disposed so as to reflect the pulse laser beam reflected off the first surface of the beam splitter BS1 and be incident on the concave mirror 102. The concave mirrors 101 and 102 are disposed so as to cause the pulse laser beam reflected off the first surface of the beam splitter BS1 to transfer an image at the first surface of the beam splitter BS1 as a first image at equal magnification (1:1).

The concave mirror 103 is disposed so as to reflect the pulse laser beam reflected off the concave mirror 102 and be incident on the concave mirror 104. The concave mirror 104 is disposed so as to cause the pulse laser beam reflected off the concave mirror 104 to be incident on a second surface of the beam splitter BS1, that is the surface opposite from the first surface. The concave mirrors 103 and 104 are disposed so as to cause the first image to transfer as a second image at equal magnification at the second surface of the beam splitter BS1.

4.2 Operation

When discharge occurs in the chamber 120 of the laser oscillator 12, the excimer laser gas is excited, and a pulse laser beam generated by the optical resonator, which includes the output coupling mirror 128 and the rear mirror 126, is outputted via the output coupling mirror 128. The pulse laser beam having exited via the output coupling mirror 128 enters the OPS 100, which extends the pulse width of the pulse laser beam.

That is, the pulse laser beam having entered the OPS 100 is incident on the first surface of the beam splitter BS1. The beam splitter BS1 transmits part of the pulse laser beam incident on the first surface of the beam splitter BS1, and the transmitted pulse laser beam exits out of the OPS 100 as a zero-circulation pulse laser beam that has not circulated on the optical delay path. The zero-circulation beam is synonymous with no-circulation beam and is also called a "through beam".

On the other hand, out of the pulse laser beam incident on the first surface of the beam splitter BS1, the pulse laser beam reflected off the first surface of the beam splitter BS1 enters the optical delay path and is reflected off the concave mirrors 101 to 104. Part of the pulse laser beam incident from the concave mirror 104 on the second surface of the beam splitter BS1 is reflected off the second surface of the beam splitter BS1, and exits out of the OPS 100 as a one-circulation pulse laser beam having circulated on the optical delay path once. The one-circulation pulse laser beam exits later by a delay period Δt1 than the zero-circulation pulse laser beam. The delay period Δt1 can be expressed as Δt1=LOPS/c, where LOPS represents the optical path length (circulation distance) of the optical delay path of the OPS 100, and c represents the speed of light.

Out of the pulse laser beam incident from the concave mirror 104 on the second surface of the beam splitter BS1, the pulse laser beam that the beam splitter BS1 has transmitted further enters the optical delay path, is reflected off the four concave mirrors 101 to 104, and is incident on the second surface of beam splitter BS1. The pulse laser beam reflected off the second surface of the beam splitter BS1 then exits out of the OPS 100 as a two-circulation pulse laser beam having circulated on the optical delay path twice. The two-circulation pulse laser beam exits later by the delay period Δt1 than the one-circulation pulse laser beam.

After the beam repeatedly circulates on the optical delay path as described above, the OPS 100 outputs a pulse laser beam as a result of superposition of the pulses of the beams having circulated none, once, twice, three times, and so on on one another. The optical intensity of the circulation beam that exits out of the OPS 100 decreases as the number of circulations of the optical delay path increases.

The one-circulation beam and the following beams are each delayed by an integer multiple of the delay period Δt1 from the zero-circulation beam, combined with one another, and outputted from the OPS 100, so that the pulse waveforms of the circulation beams including the no-circulation beam are superimposed on one another with time differences. The pulse width of the pulse laser beam is thus extended by the OPS 100.

The pulse laser beam having passed through the OPS 100 passes through the monitor module 16 and is outputted from the excimer laser apparatus 10A. The pulse laser beam having exited via the output coupling mirror 128 is an example of the "first pulse laser beam" in the present disclosure. The pulse laser beam having the pulse width stretched by the OPS 100 is an example of the "second pulse laser beam" in the present disclosure.

Figure 5:
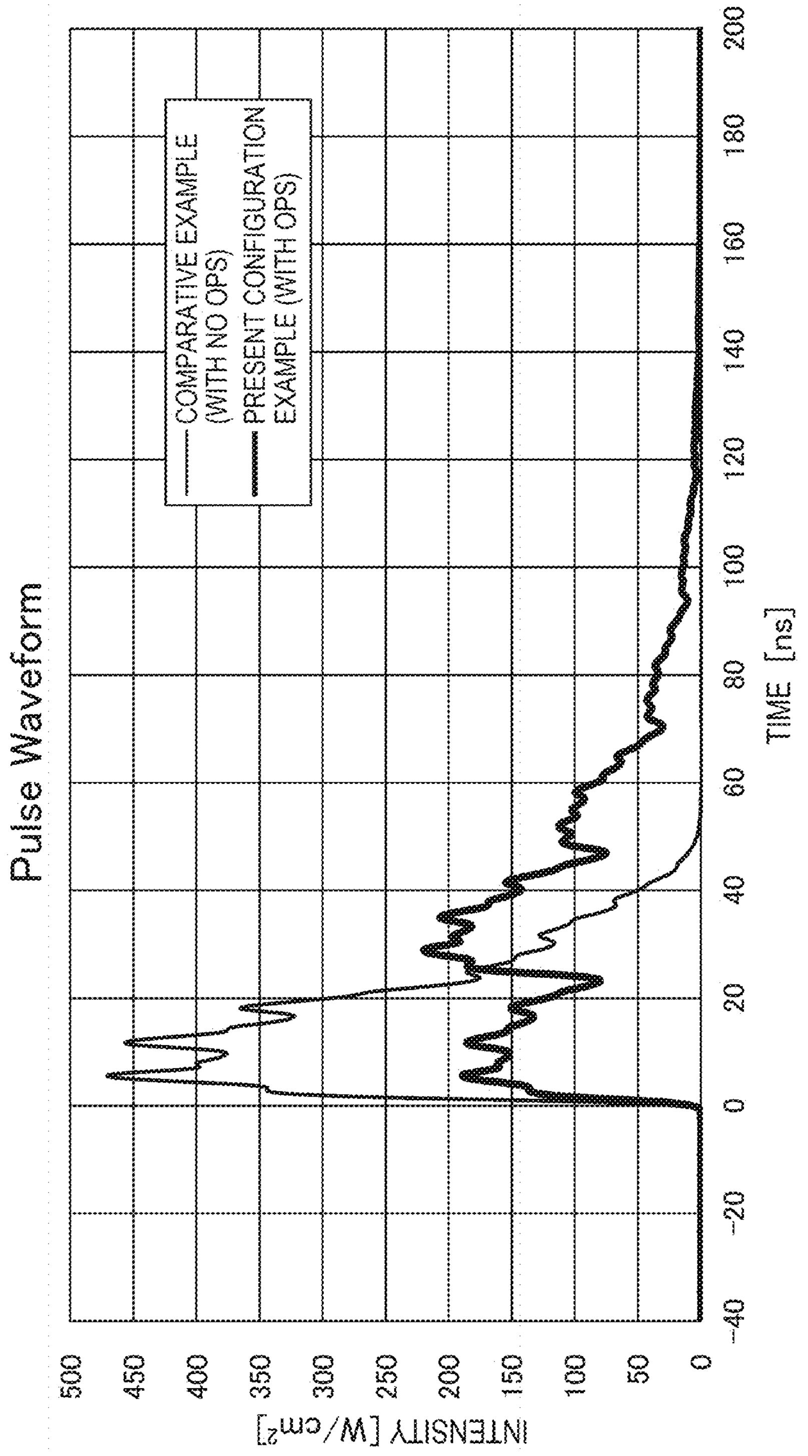
FIG. 5 is a graph showing an example of a waveform of a pulse laser beam outputted from the excimer laser apparatus according to the first embodiment.

FIG. 5 is a graph showing an example of the waveform of the pulse laser beam outputted from the excimer laser apparatus 10A. The horizontal axis represents the time, and the vertical axis represents the intensity. FIG. 5 further shows the waveform of the pulse laser beam outputted from the excimer laser apparatus 10 according to Comparative Example. The pulse laser beam outputted from the excimer laser apparatus 10 according to Comparative Example, which does not include the OPS 100, has, for example, a TIS of 32 ns.

On the other hand, assuming in the excimer laser apparatus 10A according to the first embodiment, for example, that the beam splitter BS1 of the OPS 100 has a reflectance of is 60%, and the circulation distance is 7 m, TIS of the pulse laser beam outputted from the excimer laser apparatus 10A is extended to about 74 ns. The pulse laser beam that exits out of the OPS 100 has a pulse waveform having the pulses of the no-circulation beam and the pulses of each circulation beam having circulated on the optical delay path at least once, the pulses successively combined with one another, and the entire combined pulse waveform can be a single irradiation pulse.

Figure 6:
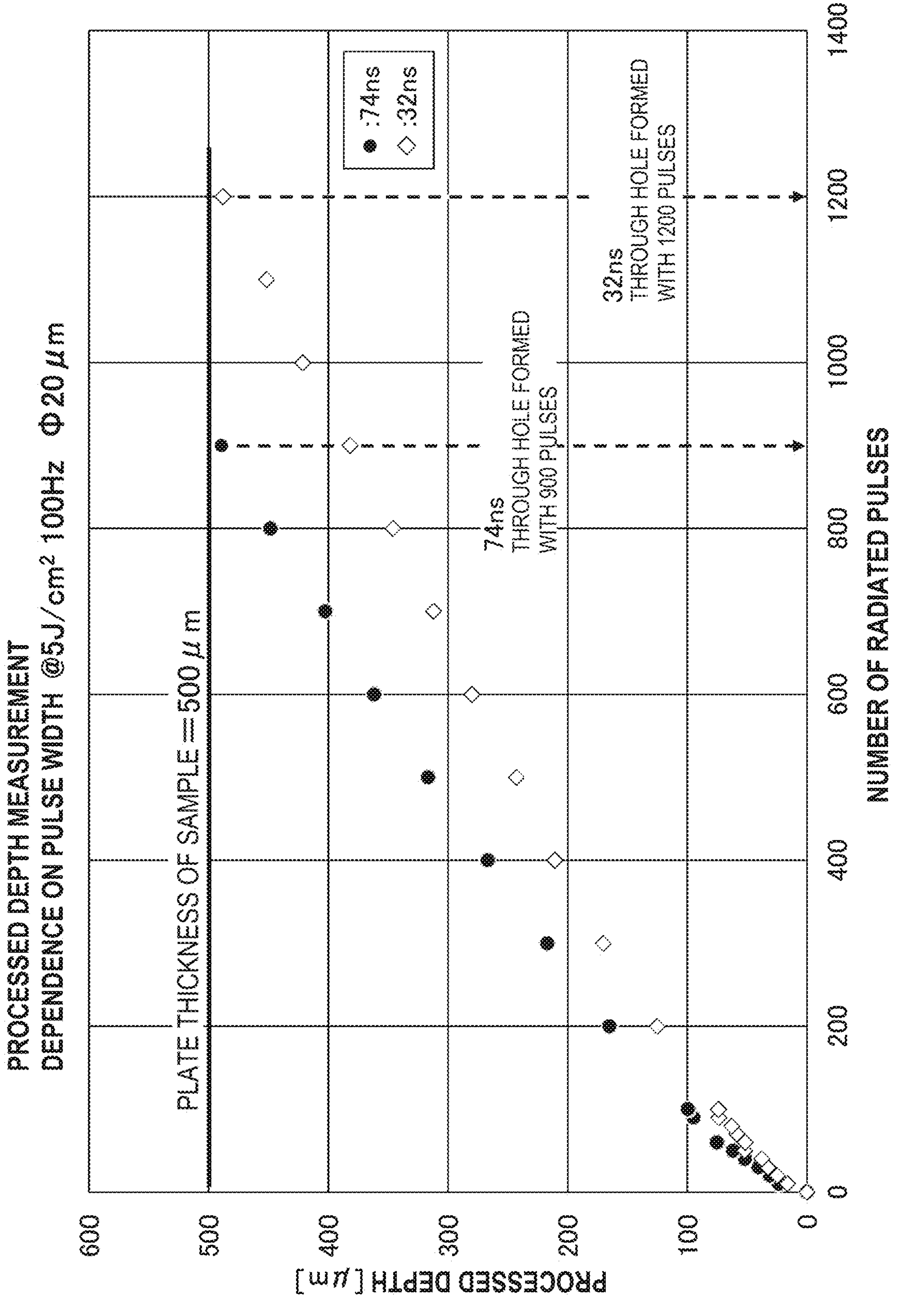
FIG. 6 shows graphs illustrating the relationship between the number of irradiation pulses and a processed depth in the processing of glass for microscopic hole formation.

FIG. 6 shows graphs illustrating the relationship between the number of irradiation pulses and the processed depth in the processing of glass for microscopic hole formation. The horizontal axis represents the number of irradiation pulses, and the vertical axis represents the processed depth. The glass to be processed is alkali-free glass having a plate thickness of 500 μm, and the wavelength of the pulse laser beam with which the alkali-free glass is irradiated is 248 nm. Alkali-free glass is used, for example, as a material of glass interposers and micro-LED (light emitting diode) displays. The microscopic hole formed in the alkali-free glass may, for example, be a through hole for wiring. A through hole can be directly formed in the alkali-free glass by irradiating the alkali-free glass with the pulse laser beam multiple times.

FIG. 6 shows a case using the pulse laser beam according to Comparative Example, in which TIS is 32 ns, and a case using the pulse laser beam according to the first embodiment, in which TIS is 74 ns. The number of irradiation pulses that achieves a processed depth of 500 μm is 1200 for the pulse laser beam according to Comparative Example (TIS: 32 ns), whereas the number of irradiation pulses is 900 for the pulse laser beam according to the first embodiment (TIS: 74 ns), as shown in FIG. 6.

Extending TIS from 32 ns to 74 ns therefore provides the effect of increasing the processing rate and reducing the number of pulses required for the processing by 25%.

Figure 7:
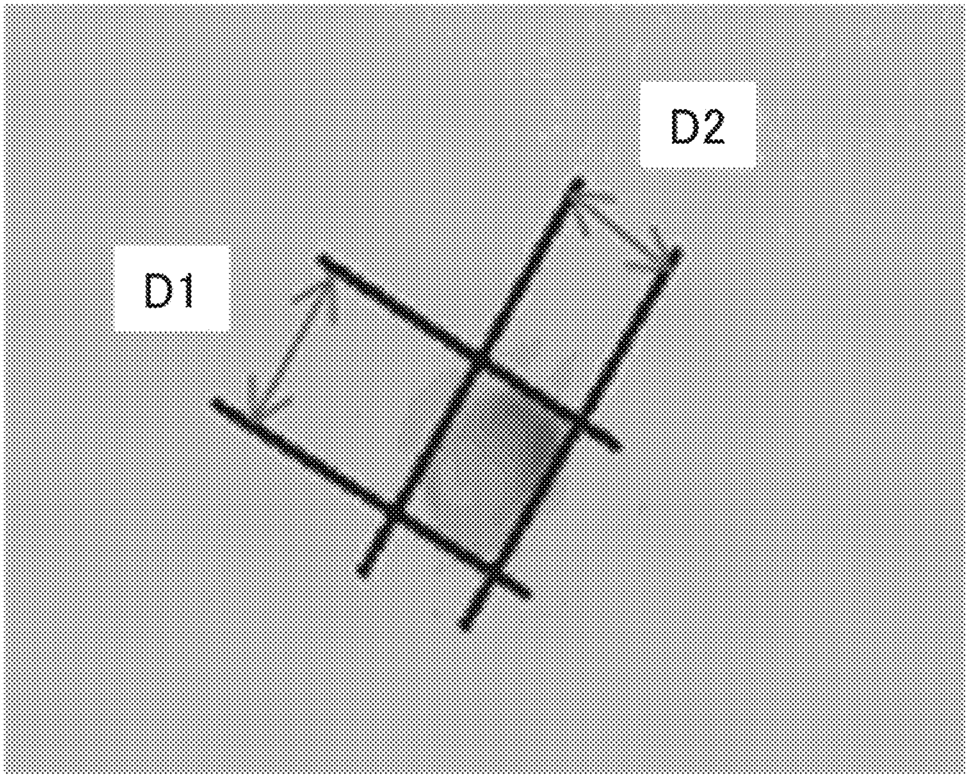
FIG. 7 is an image showing the result of observation of the glass surface after the glass is irradiated with the pulse laser beam corresponding to one pulse.

FIG. 7 shows the result of observation of the glass surface after the alkali-free glass is irradiated with the pulse laser beam corresponding to one pulse. It is assumed in the image of the result of the observation shown in FIG. 7 that D1 and D2 represent the major and minor diameters of the region processed by the irradiation of the pulse laser beam, respectively, and that $D^2$ represents the product of D1 and D2. $D^2$ corresponds to the area of a rectangle circumscribing the region processed by the irradiation of the pulse laser beam. The cross-section of the pulse laser beam irradiated for the measurement of $D^2$ may have a Gaussian optical intensity distribution.

Figure 8:
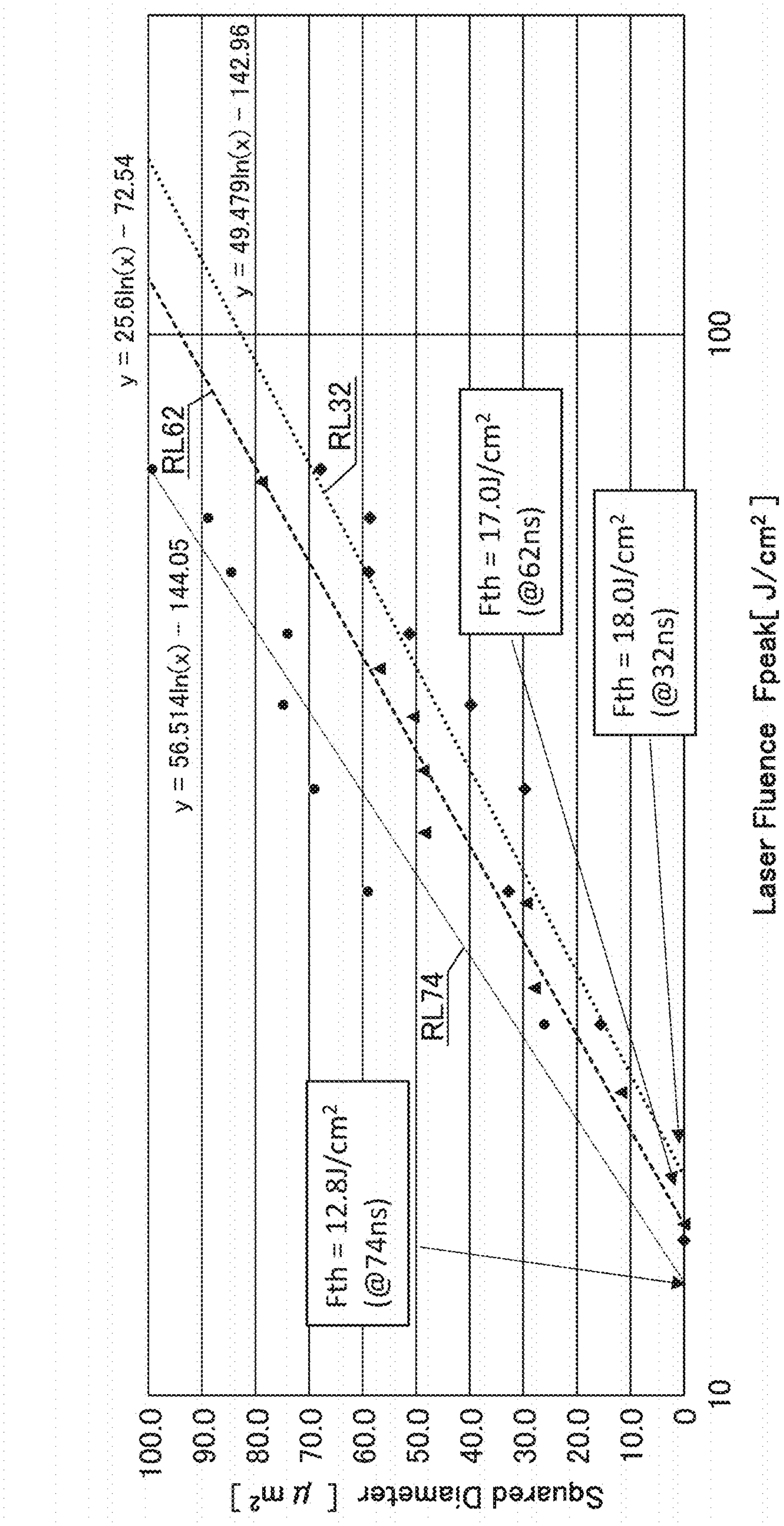
FIG. 8 shows graphs illustrating the results of measurement of a processing threshold in a $D^2$ method.

FIG. 8 shows graphs illustrating the relationship between the fluence of the pulse laser beam and the area of the rectangle circumscribing the processed region. The horizontal axis represents the fluence, and the vertical axis represents $D^2$. The graphs shown in FIG. 8 show that the fluence achieved when $D^2$ is 0 is the threshold of the fluence required for the glass processing (hereinafter referred to as processing threshold).

FIG. 8 shows the relationship between the fluence of the pulse laser beam having TIS of 32, 62, and 74 ns and $D^2$. A regression line RL32 is derived from the relationship between the fluence of the pulse laser beam having the TIS of 32 ns and $D^2$. The regression line RL32 shows that a processing threshold Fth is 18.0 J/cm$^2$ when the pulse laser beam has the TIS of 32 ns.

Similarly, a regression line RL62 is derived from the relationship between the fluence of the pulse laser beam having the TIS of 62 ns and $D^2$, and a regression line RL74 is derived from the relationship between the fluence of the pulse laser beam having the TIS of 74 ns and $D^2$. The regression line RL62 shows that the processing threshold Fth is 17.0 J/cm$^2$ when the pulse laser beam has the TIS of 62 ns, and the regression line RL74 shows that the processing threshold Fth is 12.8 J/cm$^2$ when the pulse laser beam has the TIS of 74 ns.

Extending TIS from 32 ns to 62 ns therefore reduces the fluence required for the processing by 6% and hence provides the effect of increasing the processing area by 6% for the same pulse energy. Extending TIS from 32 ns to 74 ns reduces the fluence required for the processing by 29% and hence provides the effect of increasing the processing area by 29% for the same pulse energy.

4.3 Factors Contributing to High Processing Rate Achieved by Pulse Laser Beam Having Long Pulses To investigate factors contributing to the high processing rate achieved by the pulse laser beam having long pulses each having an extended pulse width as compared with the processing rate achieved by the pulse laser beam (TIS: 32 ns) according to Comparative Example, changes in the quantity of pulse laser beam absorbed by the glass over time was measured.

Figure 9:
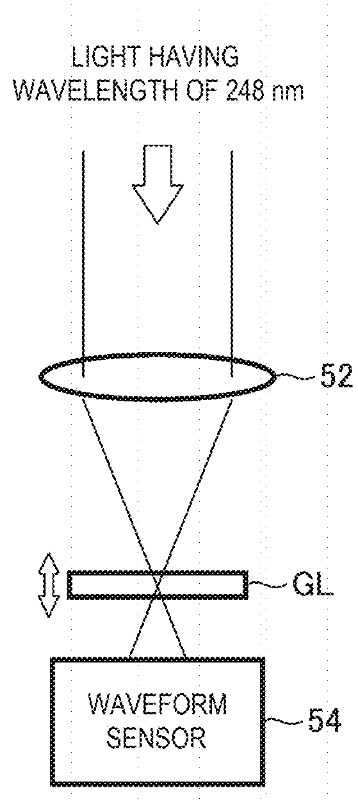
FIG. 9 describes a test setup used to measure changes in the quantity of pulse laser beam absorbed by the glass over time.

FIG. 9 describes a test setup used to measure the changes in the quantity of pulse laser beam absorbed by the glass over time. In the test setup, the glass object GL, which was a processing target object, was irradiated with the pulse laser beam having the wavelength of 248 nm via a condenser lens 52, and the optical intensity of the beam that the glass object GL has transmitted (quantity of transmitted light) was measured with a waveform sensor 54. The glass object GL was made of alkali-free glass. A bi-plane-structured photoelectric tube was used as the waveform sensor 54.

The measurement was performed by moving the glass object GL, which was the processing target object, in the direction of the optical path axis of the pulse laser beam to change the relative distance between the condenser lens 52 and the glass object GL so that the quantity of defocus of the pulse laser beam and hence the fluence thereof were changed. When the pulse laser beam is defocused, a low-fluence condition in which the fluence is smaller than the processing threshold is achieved. It may be understood that changes in the quantity of transmitted light over time that are observed when the pulse laser beam is defocused corresponds to changes in the intensity of the pulse laser beam over time with which the glass object GL is irradiated.

Figure 10:
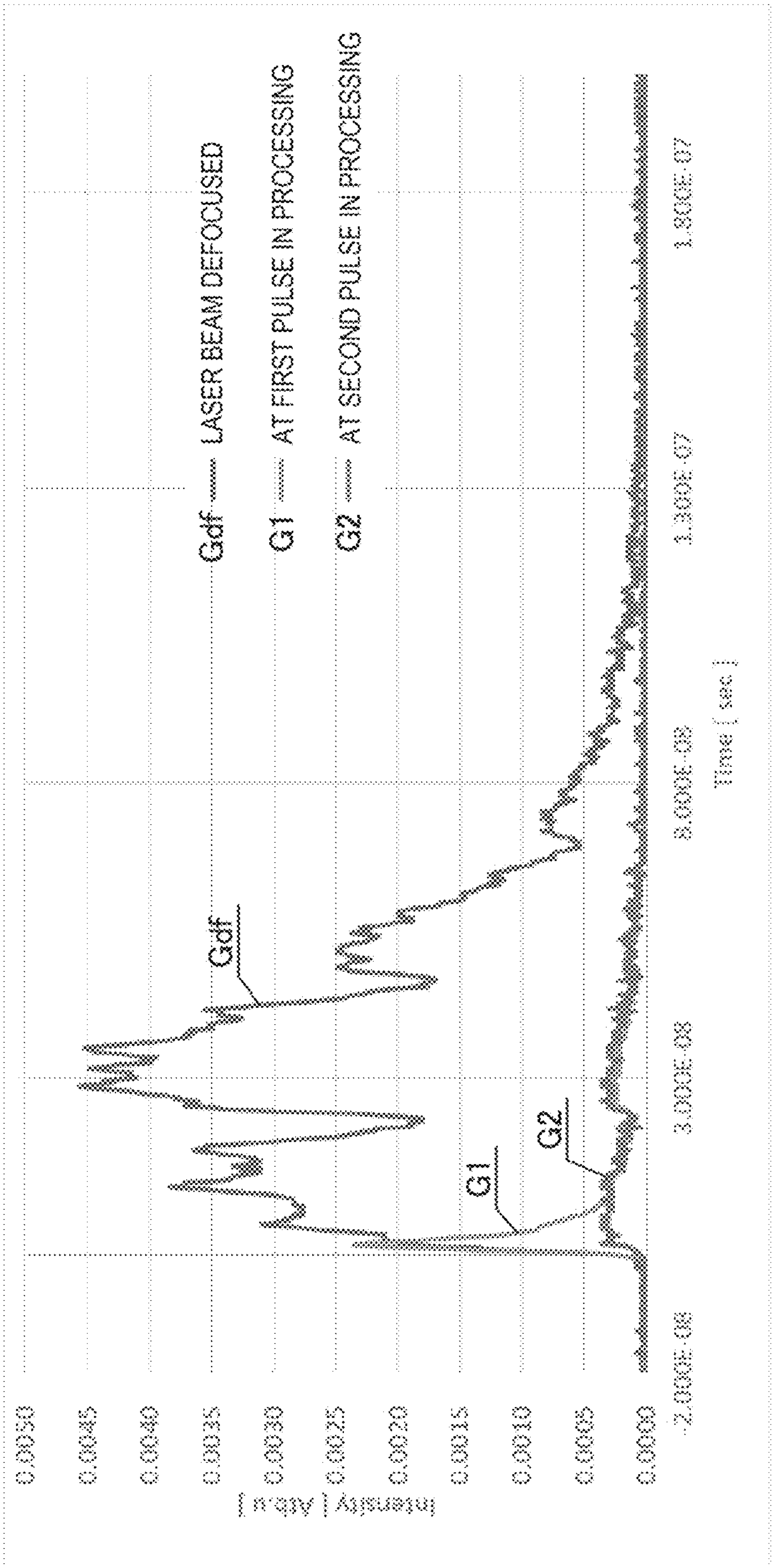
FIG. 10 shows graphs illustrating changes in the quantity of light over time which the glass transmits and which are measured with a waveform sensor shown in FIG. 9.

FIG. 10 shows graphs illustrating the changes in the quantity of light over time which the glass object GL transmits and which are measured with the waveform sensor 54. A graph G1 in FIG. 10 shows the changes in the quantity of transmitted light over time at the first pulse during the glass processing. A graph G2 shows the changes in the quantity of transmitted light over time at the second pulse during the glass processing. A graph Gdf shows the changes in the quantity of light transmitted over time when the pulse laser beam is defocused (glass is not processed).

FIG. 10 shows that the quantity of light transmitted when the fluence has a large value equal to or greater than the processing threshold is about 10% of the quantity of light transmitted when the fluence has a small value smaller than the processing threshold. It is understood by the findings described above that the energy is absorbed by the glass object GL in the processing.

Comparison between the graphs G1 and G2 clearly shows that the quantity of transmitted light is large only at the beginning of the high-fluence first pulse. A conceivable reason for this is that the glass object GL is altered and the quantity of absorbed light increases after the beginning of the first pulse.

Figure 11:
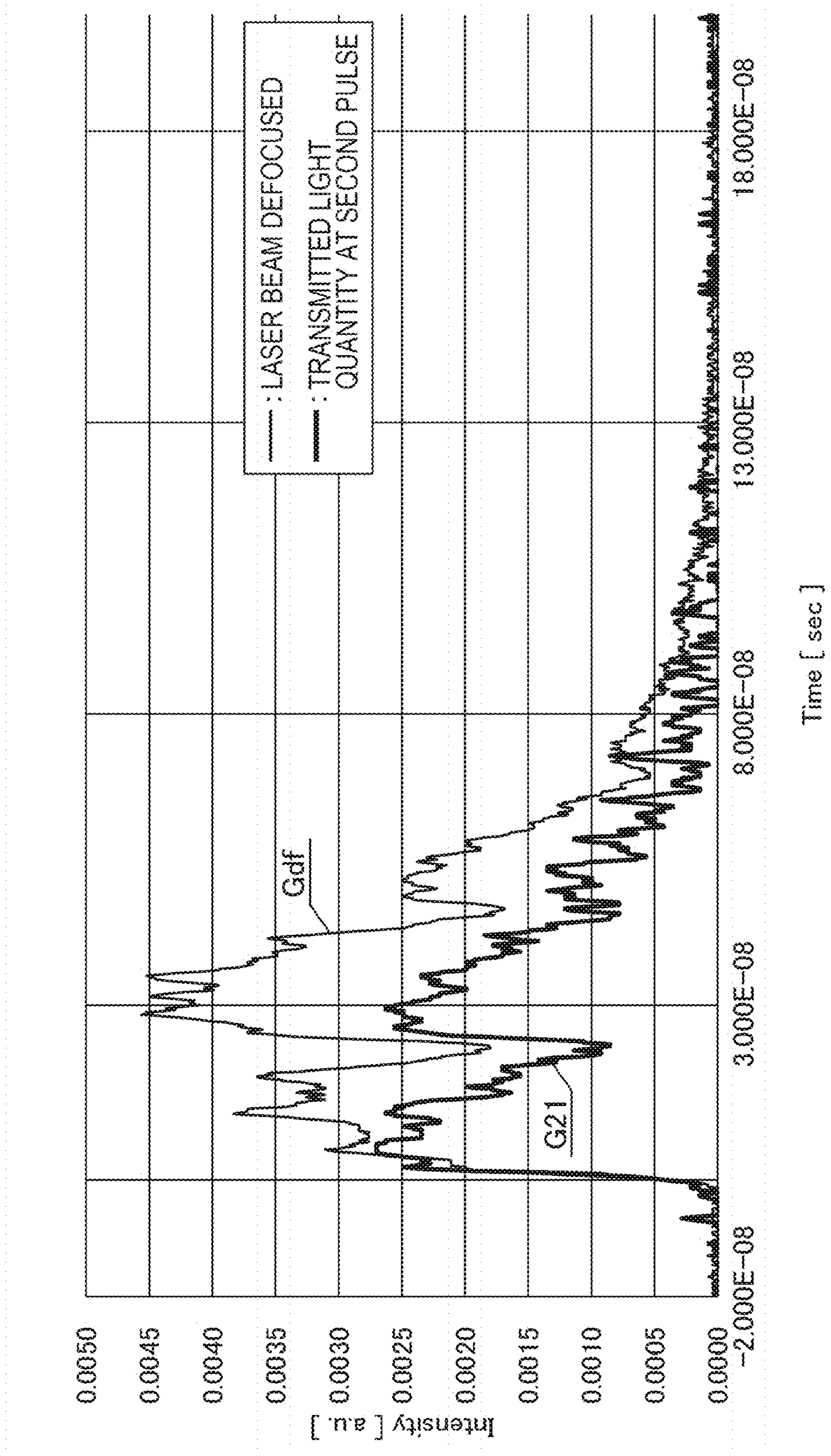
FIG. 11 shows graphs illustrating comparison between the changes in the quantity of light transmitted over time at a second and subsequent pulses when the glass is processed and the changes in the quantity of light transmitted over time when the pulse laser beam is defocused.

FIG. 11 shows graphs illustrating comparison between the changes in the quantity of light transmitted over time at the second and subsequent pulses when the glass is processed and the changes in the quantity of light transmitted over time when the pulse laser beam is defocused. The quantity of light transmitted when the pulse laser beams is defocused can be regarded as the quantity of incident light. A graph G21 in FIG. 11 shows the changes in the quantity of light transmitted over time at the second pulse when the glass is processed.

When the absorption coefficient of the glass is fixed, the two waveforms are believed to have the same shape, but they are not the same as shown in FIG. 11. This indicates that the quantity of light absorbed by the glass object GL varies among the pulses. The graph in FIG. 11 shows the quantity of transmitted light at the second pulse, and the quantities of transmitted light at the third and subsequent pulses show the same changes over time as those at the second pulse.

Figure 12:
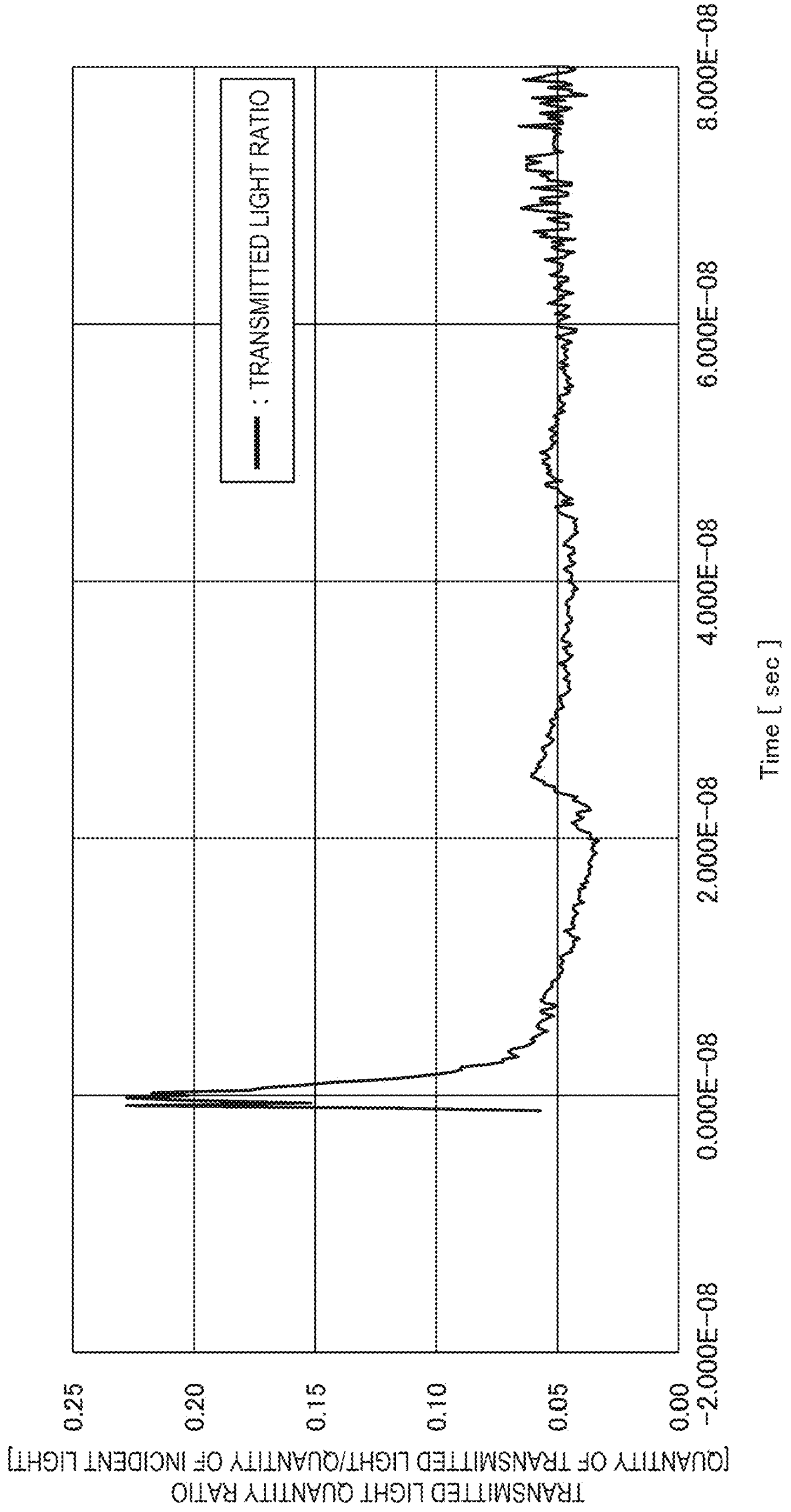
FIG. 12 is a graph showing changes in the ratio of the quantity of transmitted light to the quantity of incident light over time at the second and subsequent pulses.

FIG. 12 shows the ratio of the quantity of transmitted light to the quantity of incident light at the second and subsequent pulses in the form of a graph. The quantity of incident light described above may be the quantity of light transmitted when the pulse laser beam is defocused. The ratio of the quantity of transmitted light to the quantity of incident light is called a "transmitted light quantity ratio". The transmitted light quantity ratio is large for about 5 ns after a pulse rises, as shown in FIG. 12. That is, the quantity of light absorbed by the glass object GL is small. This accords with the fact that a long pulse achieves a high processing rate, and a conceivable reason for this is that the period of the first 5 ns after the pulse rises has a small contribution to the processing. That is, the graph in FIG. 12 shows that the contribution of the optical energy after 5 ns, where the transmitted light quantity ratio becomes small (quantity of absorbed light becomes large), is important for improvement in the processing rate.

The same phenomenon as that in FIG. 12 is observed not only at the second pulse but also at the third and subsequent pulses, and it is therefore believed that the state of the glass object GL as the processing target object is reset to the state at the second pulse at the beginning of each of a plurality of pulses of the beam with which the glass object GL is repeatedly irradiated.

In the technical field of laser drilling of glass, narrowing the pulse width of the laser beam is believed to be beneficial. However, in view of the situation in which the small value of the transmitted light quantity ratio associated with the glass object GL is reset in a very short period after the falling edge of an irradiation pulse, as indicated by the result shown in FIG. 12, narrowing the pulse width means that energy is applied in the state in which the transmitted light quantity ratio is large, which is unlikely to lead to improvement in the processing rate.

From the findings based on FIGS. 10 to 12, it is understood that the energy of the pulse laser beam irradiated in the state in which the transmitted light quantity ratio associated with the glass object GL is small contributes to improvement in the processing rate. It is therefore preferable that the pulses of each circulation beam that exits out of the OPS 100 are not a plurality of completely separate (independent) pulses, but that a preceding pulse and the following pulse partially overlap with each other into successive pulses, so that the entire waveform of the combined pulses of a plurality of circulation beams including the no-circulation beam constitutes a single pulse. That is, it is preferable that a zero-energy period is not present in the middle of one pulse as the combined waveform outputted from the OPS 100.

4.4 Relationship Between OPS Circulation Distance and TIS

Figure 13:
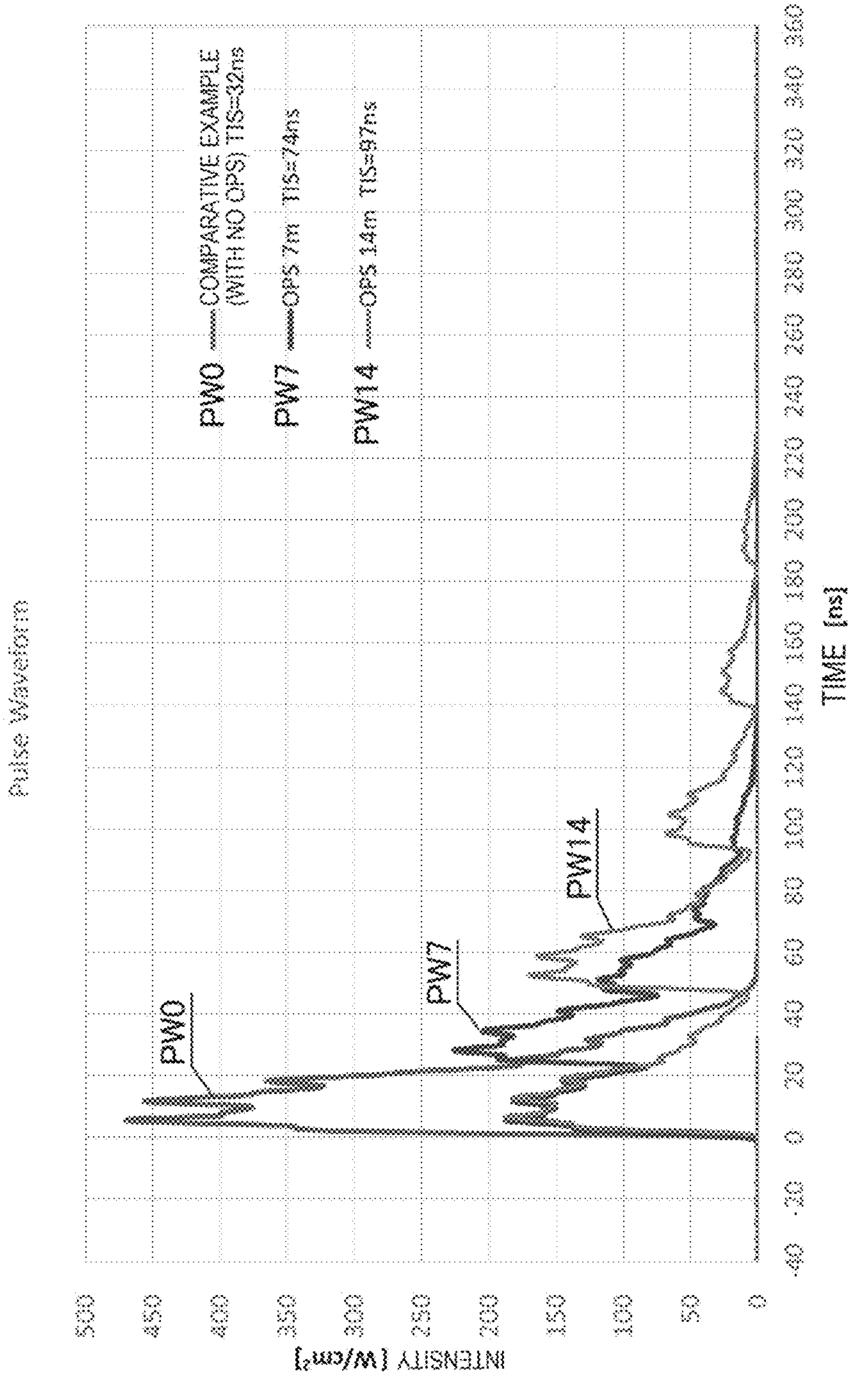
FIG. 13 shows graphs illustrating an example of the waveform of the pulse laser beam outputted when the circulation distance of the OPS is changed.

FIG. 13 shows graphs illustrating an example of the waveform of the pulse laser beam outputted when the circulation distance of the OPS 100 is changed. The horizontal axis represents the time, and the vertical axis represents the intensity. FIG. 13 shows a waveform PW7 of the pulse laser beam outputted from the OPS having a circulation distance of 7 m, and a waveform PW14 of the pulse laser beam outputted from the OPS having a circulation distance of 14 m. FIG. 13 further shows for reference a waveform PW0 of the pulse laser beam outputted from the non-OPS excimer laser apparatus 10 according to Comparative Example.

FIG. 14 is a table that summarizes the relationship between the OPS circulation distance, TIS of the outputted pulse laser beam, and an energy ratio in the region from 5 ns after a pulse rises to 400 ns. The term "OPS-R" in FIG. 14 refers to the reflectance of the beam splitter BS1. FIG. 14 shows cases where the circulation distance of the OPS 100 is 7 m, 14 m, and 21 m. The term "energy ratio" is the proportion (ratio) of the energy in the region from 5 ns after a pulse rises to 400 ns to the pulse energy in the region up to 400 ns including the period from the rise of the pulse laser beam to the fall thereof (end of pulse). Increasing the circulation distance of the OPS 100 allows extension of TIS, as shown in FIG. 14. Increasing the circulation distance of the OPS 100 to 14 m or 21 m allows extension of TIS to 97 ns. Furthermore, the energy ratio in the region from 5 ns after a pulse rises to 400 ns can be increased to 95%.

The pulse end time of "400 ns" is determined from the viewpoint of a period long enough for the energy of the pulse laser beam to become zero. The pulse waveform of the pulse laser beam outputted from the OPS 100 varies depending on the specific configuration of the OPS 100 and other factors. Therefore, after a pulse rises, the period required for the energy to become zero depends on the waveform of the pulse. A variety of pulse waveforms are conceivable. In consideration of a practical configuration, the energy of the pulse laser beam can be zero in 400 ns at the latest after a pulse rises. In the present disclosure, the energy ratio in the region from 5 ns after a pulse rises to the end of the pulse is evaluated by determining the energy ratio in the region from 5 ns after the pulse rises to 400 ns.

4.5 Relationship Between Reflectance of Beam Splitter in OPS and TIS

FIG. 15 is a table showing the result of calculation of TIS of the pulse laser beam outputted when the reflectance of the beam splitter BS1 in the OPS 100 is changed, and the energy ratio in the region from 5 ns after a pulse rises to 400 ns. The condition in FIG. 15 stating that the reflectance is 40% and TIS is 62 ns corresponds to the condition described in FIG. 8 and stating that TIS is 62 ns. The condition in FIG. 15 stating that the reflectance is 60% and TIS is 74 ns corresponds to the condition described in FIG. 8 and stating that TIS is 74 ns.

Figure 16:
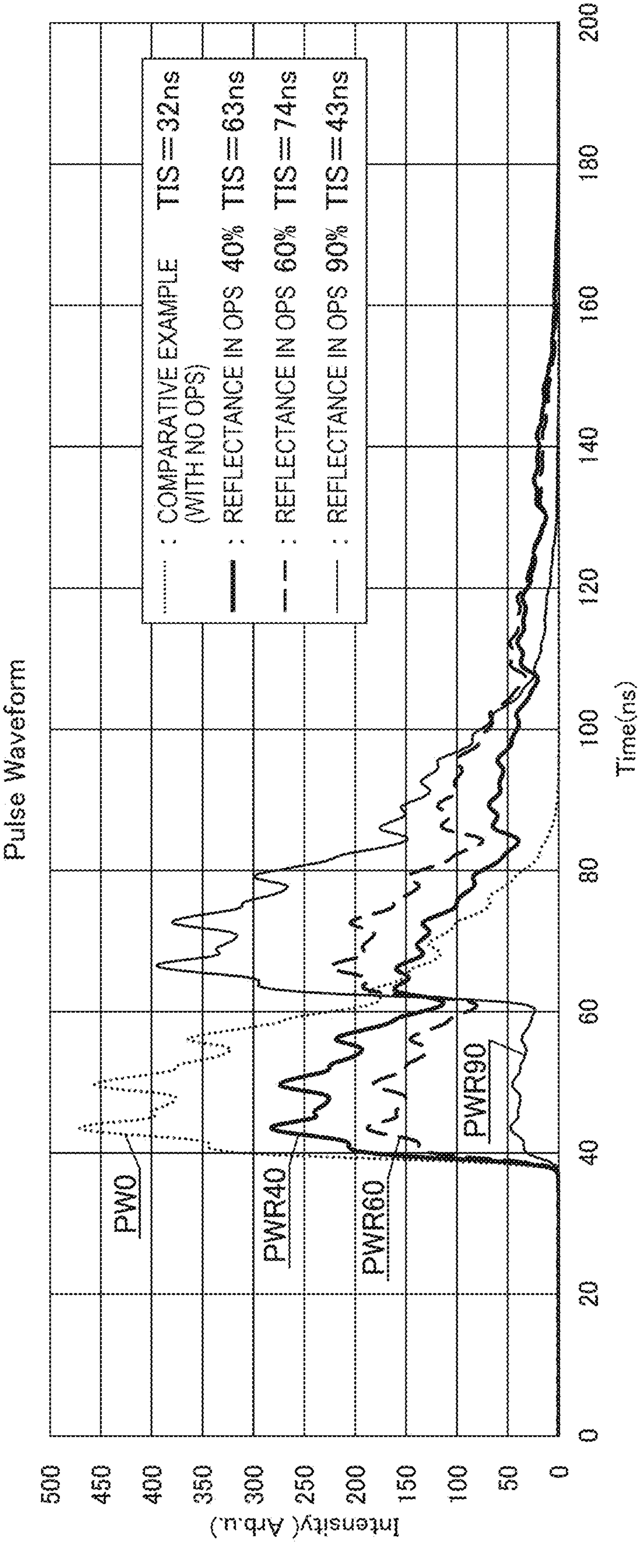
FIG. 16 shows graphs illustrating examples of the waveform of the pulse laser beam outputted when the reflectance of the beam splitter in the OPS is changed.

FIG. 16 shows graphs illustrating examples of the waveform of the pulse laser beam outputted when the reflectance of the beam splitter BS1 in the OPS 100 is changed. The horizontal axis represents the time, and the vertical axis represents the intensity. FIG. 16 shows a waveform PWR40 of the pulse laser beam outputted from the OPS in which the reflectance of the beam splitter BS1 is 40%, a waveform PWR60 of the pulse laser beam outputted from the OPS in which the reflectance of the beam splitter BS1 is 60%, and a waveform PWR90 of the pulse laser beam outputted from the OPS in which the reflectance of the beam splitter BS1 is 90%. FIG. 16 further shows for reference a waveform PW0 of the pulse laser beam outputted from the non-OPS excimer laser apparatus 10 according to Comparative Example.

Increasing the reflectance of the beam splitter BS1 in the OPS 100 to a value greater than or equal to 40% allows extension of TIS, as shown in FIGS. 15 and 16.

Further increasing the reflectance of the beam splitter BS1 in the OPS 100 to a value greater than 40% allows extension of TIS to 74 ns. Increasing the reflectance of the beam splitter BS1 in the OPS 100 to a value greater than or equal to 40% further allows the energy ratio in the region from 5 ns after a pulse rises to 400 ns to increase to a value greater than or equal to 91% but smaller than or equal to 99%.

4.6 Effects

Examination under the condition of the energy ratio in the region from 5 ns after a pulse rises to 400 ns in place of the condition of TIS for the graphs shown in FIG. 6 clearly shows that the processing rate can be improved by irradiating alkali-free glass with a pulse laser beam having an energy ratio of at least 91% in the region from 5 ns after the pulse rises to 400 ns.

4.7 Variations

The OPS 100 described in the first embodiment has a form in which the optical delay path is formed by the four concave mirrors 101 to 104, but the configuration of the OPS is not limited thereto. For example, the optical delay path can be formed by six concave mirrors or eight or more concave mirrors.

5. Second Embodiment

5.1 Configuration

Figure 17:
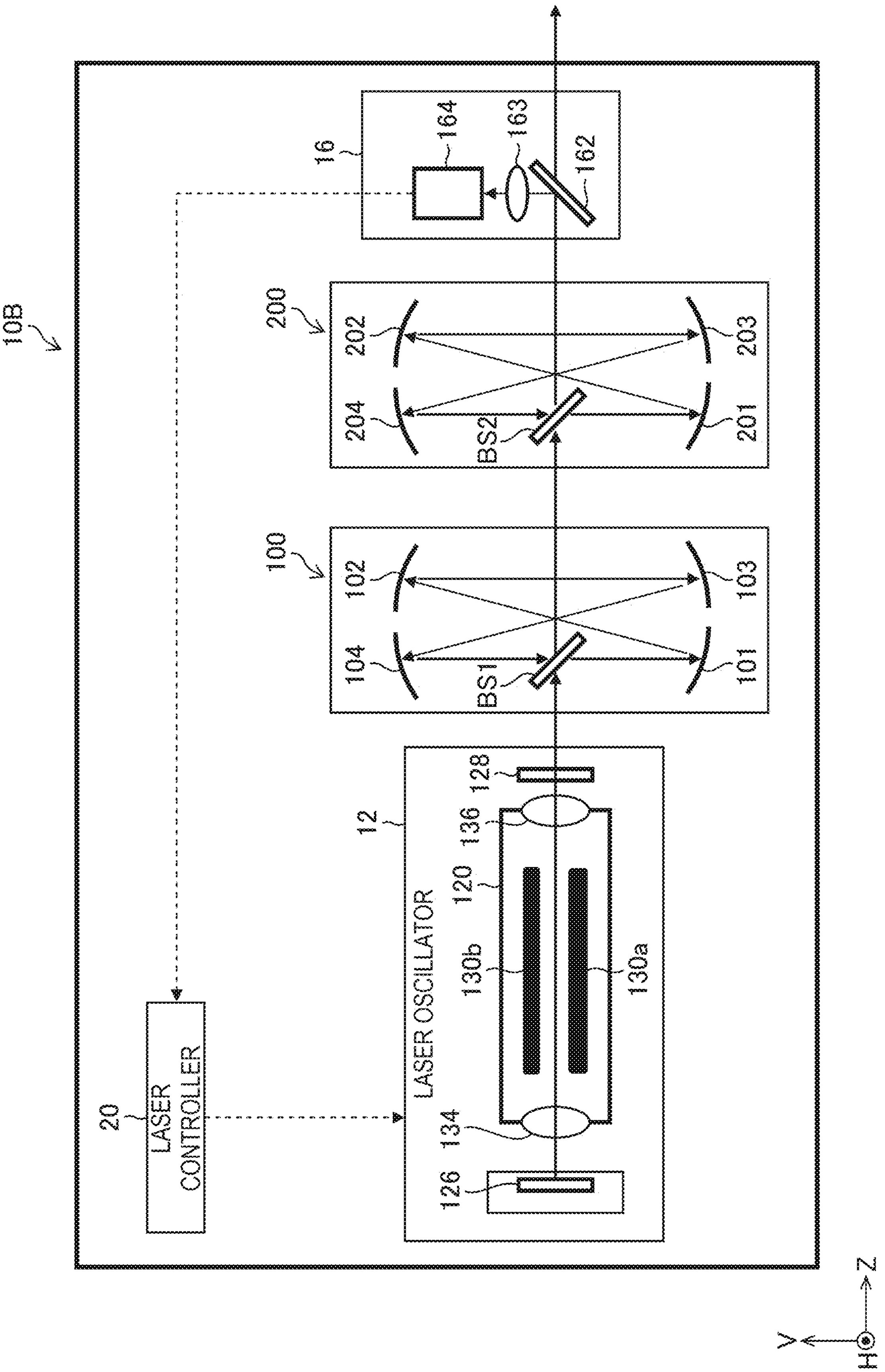
FIG. 17 schematically shows the configuration of an excimer laser apparatus according to a second embodiment.

FIG. 17 schematically shows the configuration of an excimer laser apparatus 10B according to a second embodiment. Differences in configuration between FIGS. 17 and 3 will be described.

The excimer laser apparatus 10B includes a plurality of OPSes, the OPS 100 and an OPS 200, in the optical path between the laser oscillator 12 and the monitor module 16. In the excimer laser apparatus 10B, the OPS 200 is disposed on the optical path between the OPS 100 and the monitor module 16.

The OPS 200 includes a beam splitter BS2 and four concave mirrors 201 to 204. The OPS 200 may have the same configuration as that of the OPS 100 described in FIG. 4. The circulation distance of the OPS 200 may be equal to or different from that of the OPS 100.

5.2 Operation

The pulse laser beam outputted from the OPS 100 enters the OPS 200. The pulse width of the pulse laser beam having entered the OPS 200 is further extended by the OPS 200. The OPS 200 operates in the same manner in which the OPS 100 operates. The beam splitter BS2 and the concave mirrors 201 to 204 of the OPS 200 play the same roles of the corresponding elements of the OPS 100.

TIS can be further extended by disposing the plurality of optical pulse stretchers 100 and 200 directly in the optical path of the pulse laser beam. The configuration in which two OPSes are disposed is presented by way of example, but the number of OPSes is not limited to two and can be three or more.

5.3 Relationship Between the Number of OPSes, Pulse Waveform, and TIS

Figure 18:
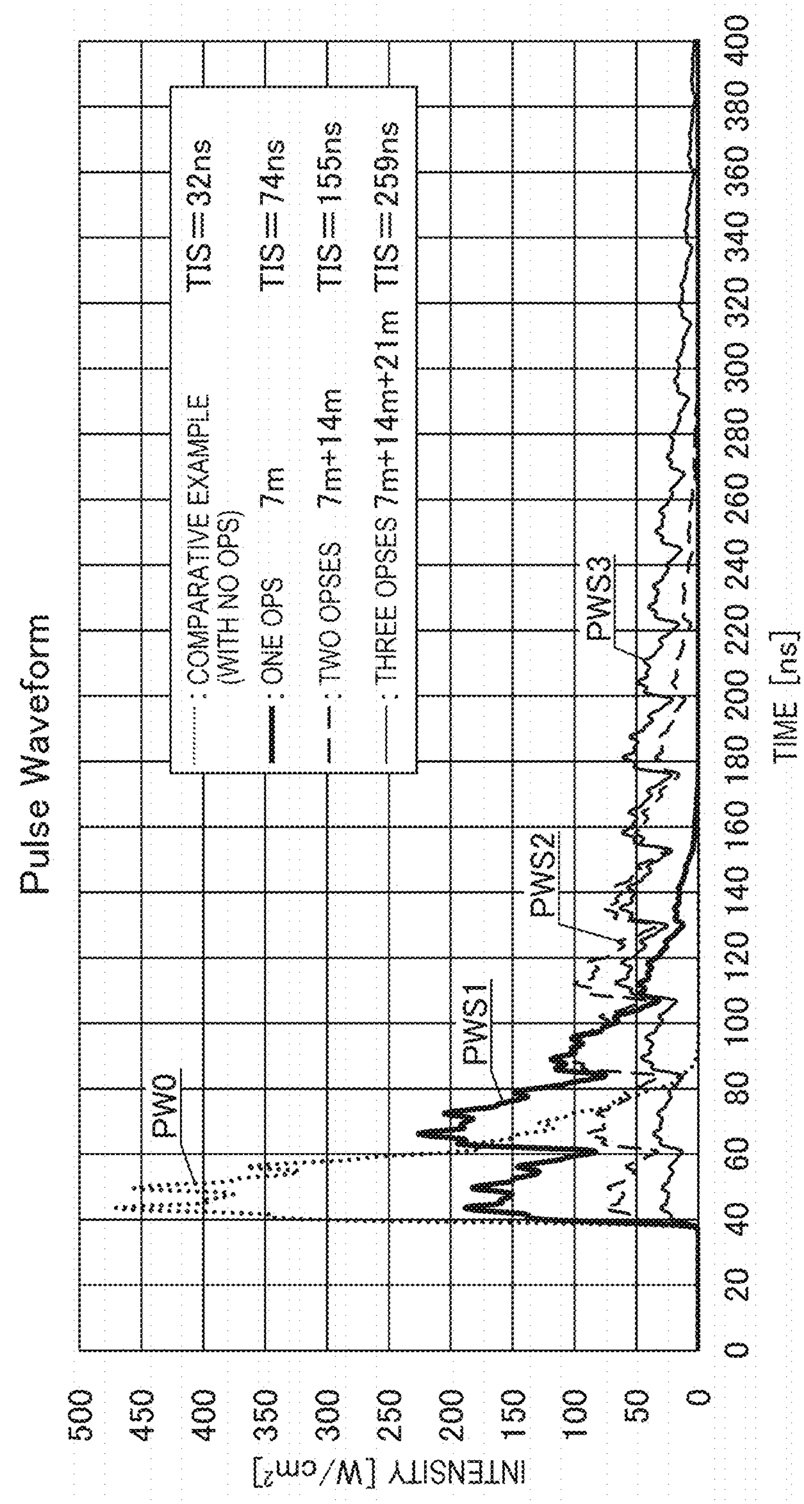
FIG. 18 shows examples of the waveform of the pulse laser beam outputted when the number of OPSes is changed.

FIG. 18 shows graphs illustrating examples of the waveform of the pulse laser beam outputted when the number of OPSes is changed. The horizontal axis represents the time, and the vertical axis represents the intensity. FIG. 18 shows a waveform PWS1 of the pulse laser beam outputted from a configuration in which one OPS (circulation distance: 7 m) is disposed, a waveform PWS2 of the pulse laser beam outputted from a configuration in which two OPSes (circulation distance: 7 m+14 m) are disposed, and a waveform PWS3 of the pulse laser beam outputted from a configuration in which three OPSes (circulation distance: 7 m+14 m+21 m) are disposed. FIG. 18 further shows for reference a waveform PW0 of the pulse laser beam outputted from the non-OPS excimer laser apparatus 10 according to Comparative Example.

FIG. 19 is a table showing TIS of the pulse laser beam outputted when the number of OPSes is changed and the result of calculation of the energy ratio in the region from 5 ns after a pulse rises to 400 ns. In FIG. 19, the circulation distance of the first OPS 100 is 7 m, the circulation distance of the second OPS 200 is 14 m, and the circulation distance of the third OPS, which is not shown, is 21 m by way of example, and the circulation distances of the OPSes are not limited to those described above and can be a variety of other values.

TIS is extended to 155 ns by disposing the two OPSes, and the energy ratio in the region from 5 ns after a pulse rises to 400 ns is improved to 98%, as shown in FIGS. 18 and 19.

TIS is extended to 259 ns by disposing the three OPSes, and the energy ratio in the region from 5 ns after a pulse rises to 400 ns is improved to 99%.

TIS is extended by employing the configuration in which one or more OPSes are disposed as described above, whereby the energy ratio in the region from 5 ns after a pulse rises to 400 ns can be increased, resulting in an increase in the processing rate.

Since energy loss greatly increases as the number of OPSes is increased to three or more, it is preferable to use one or two OPSes.

5.4 Effects

The glass processing method according to the second embodiment allows grater extension of the pulse width than in the first embodiment, and the energy ratio in the region from 5 ns after a pulse rises to 400 ns can therefore be increased, whereby the processing rate is further improved.

6. Third Embodiment 6.1 Configuration

Figure 20:
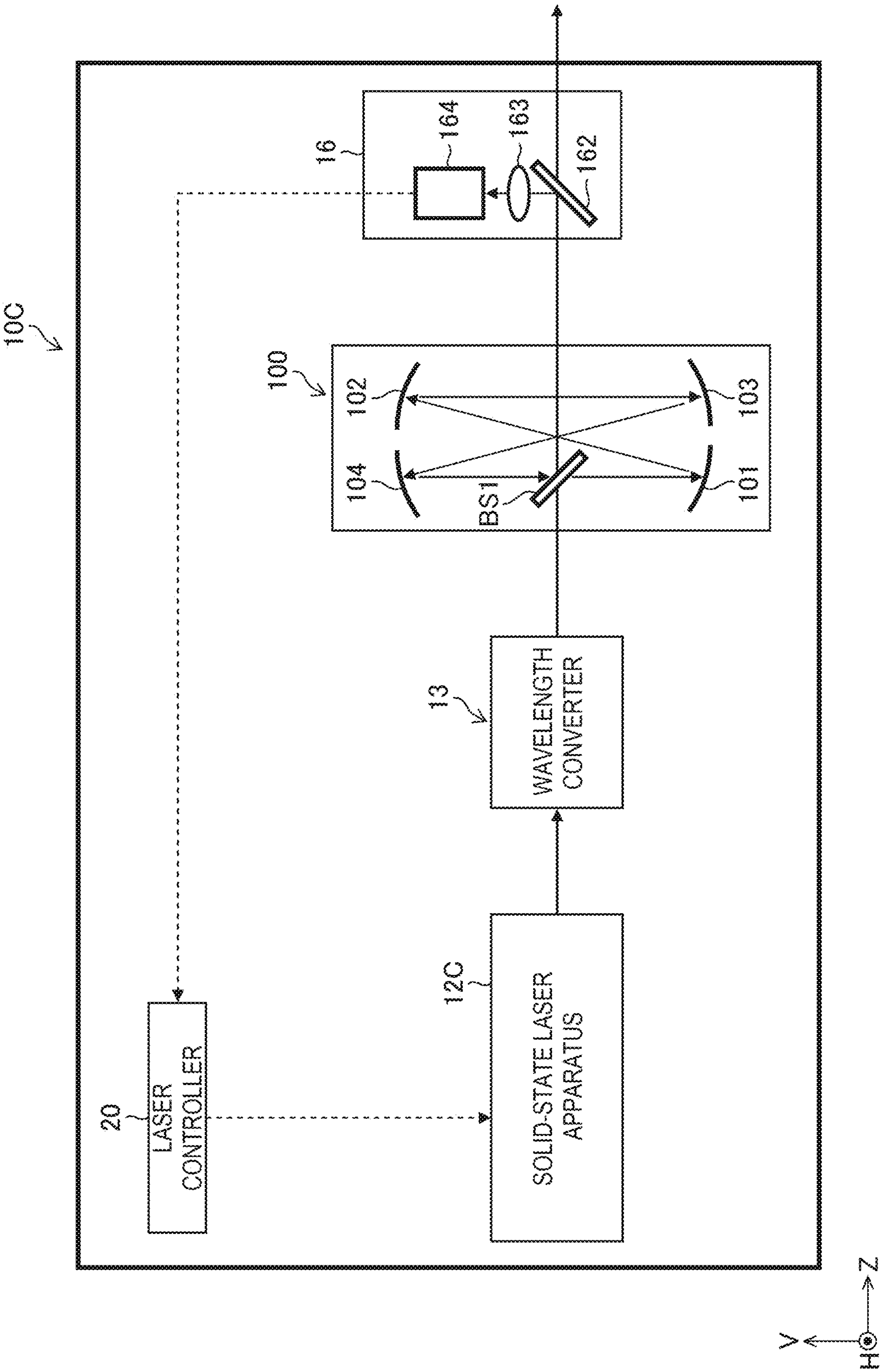
FIG. 20 schematically shows the configuration of a laser apparatus according to a third embodiment.

FIG. 20 schematically shows the configuration of a laser apparatus 10C according to a third embodiment. Differences in configuration between FIGS. 20 and 3 will be described. FIG. 3 shows the excimer laser apparatus 10A by way of example as a laser apparatus that outputs a pulse laser beam. In the third embodiment shown in FIG. 20, the excimer laser apparatus 10A is replaced with the laser apparatus 10C, which outputs fourth harmonic of the beam generated by a solid-state laser.

The laser apparatus 10C includes a solid-state laser apparatus 12C and a wavelength converter 13 in place of the laser oscillator 12 in FIG. 3. The solid-state laser apparatus 12C may be a YAG laser apparatus that outputs a laser beam having, for example, an oscillation wavelength of 1030 nm or 1064 nm.

The wavelength converter 13 is disposed in the optical path between the solid-state laser apparatus 12C and the OPS 100. The wavelength converter 13 may be disposed in the optical path between the OPS 100 and the monitor module 16, but is preferably disposed upstream from the OPS 100, as shown in FIG. 20, from the viewpoint of energy efficiency.

The wavelength converter 13 may include two second harmonic generation (SHG) crystals or one fourth harmonic generation (FHG) crystal. The nonlinear optical crystal disposed in the wavelength converter 13 may, for example, be an LBO ($LiB_3O_5$) or CLBO ($CsLiB_6O_{10}$) crystal. The combination of the solid-state laser apparatus 12C and the wavelength converter 13 is an example of the "laser oscillator" in the present disclosure.

6.2 Operation

The pulse laser beam outputted from the solid-state laser apparatus 12C is converted by the wavelength converter 13 into a pulse laser beam having a wavelength of 257.5 nm, which is the wavelength of the fourth harmonic of a pulse laser beam having the wavelength of 1030 nm, or a pulse laser beam having a wavelength of 266 nm, which is the wavelength of the fourth harmonic of a pulse laser beam having the wavelength of 1064 nm.

The pulse width of the pulse laser beam outputted from the wavelength converter 13 is extended by the OPS 100.

6.3 Effects

The laser apparatus 10C according to the third embodiment, which generates the pulse laser beam having the UV wavelength of 257.5 nm or 266 nm, which is substantially equal to 248 nm, which is the wavelength at which a KrF excimer laser apparatus oscillates, can provide the same effects as those provided by the first embodiment.

7. Fourth Embodiment 7.1 Configuration

Figure 21:
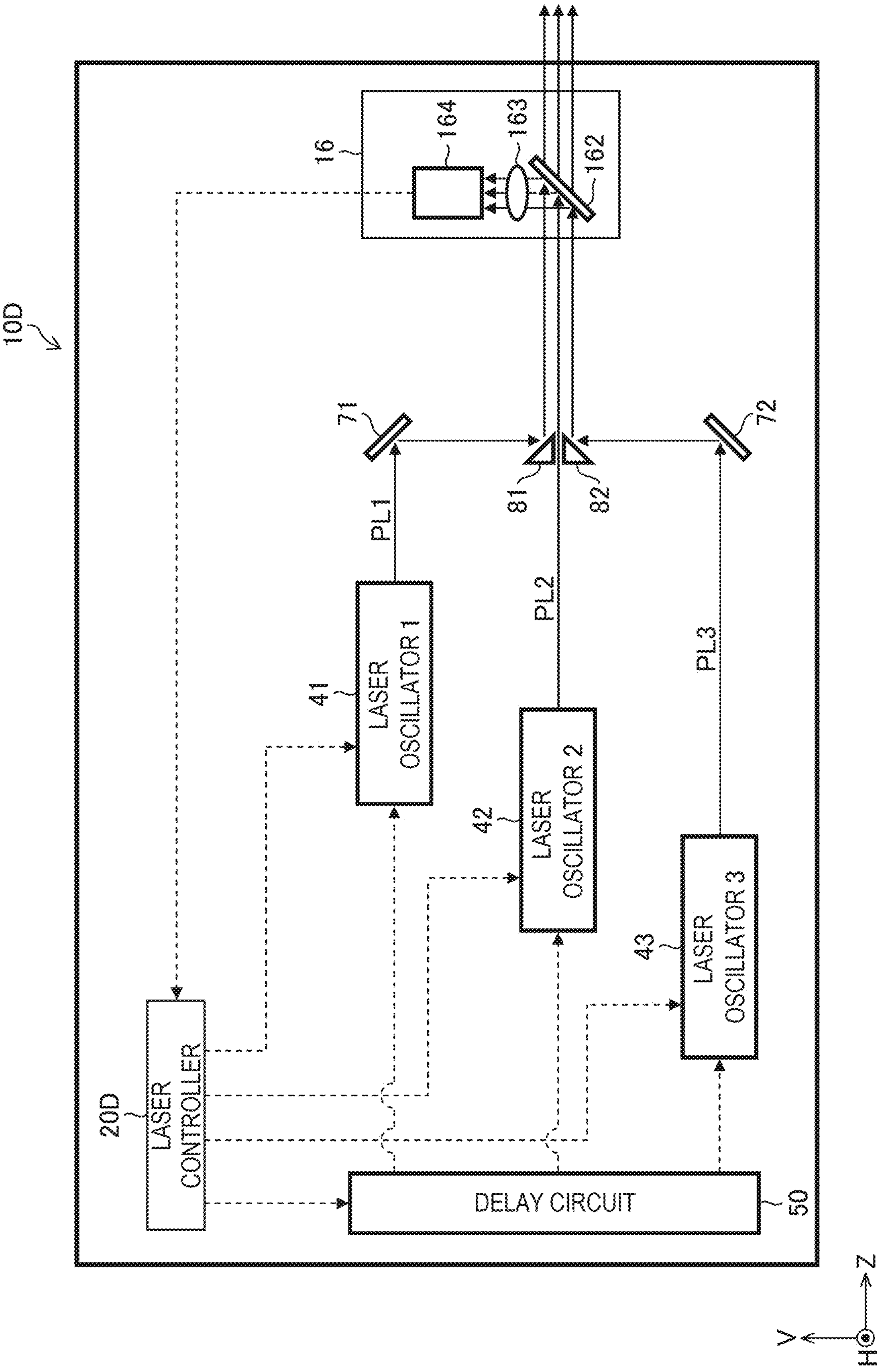
FIG. 21 schematically shows the configuration of a laser system according to a fourth embodiment.

FIG. 21 schematically shows the configuration of a laser system 10D according to a fourth embodiment. Differences in configuration between FIGS. 21 and 3 will be described. FIG. 3 shows the excimer laser apparatus 10A by way of example as a laser apparatus that outputs a pulse laser beam. In the fourth embodiment shown in FIG. 21, the excimer laser apparatus 10A is replaced with the laser system 10D, which includes a plurality of laser oscillators 41, 42, and 43. FIG. 21 shows a form in which the three laser oscillators 41, 42, and 43 are provided by way of example, and the number of laser oscillators is not limited to three, and a configuration including two or more or any other appropriate number of laser oscillators can be employed.

The laser system 10D includes the plurality of laser oscillators 41, 42, and 43, a delay circuit 50, the monitor module 16, a laser controller 20D, highly reflective mirrors 71 and 72, and knife-edge mirrors 81 and 82. A propagation optical system including the highly reflective mirrors 71 and 72 and the knife-edge mirrors 81 and 82 is an example of the "propagation optical system" in the present disclosure. The highly reflective mirror 71 is an example of the "first mirror" in the present disclosure, and the highly reflective mirror 72 is an example of the "second mirror" in the present disclosure. The knife-edge mirror 81 is an example of the "first knife-edge mirror" in the present disclosure, and the knife-edge mirror 82 is an example of the "second knife-edge mirror" in the present disclosure.

The laser oscillators 41, 42, and 43 may, for example, each have the same configuration as that of the laser oscillator 12 in FIG. 3, or may be a laser oscillator including the solid-state laser apparatus 12C, such as a YAG laser shown in FIG. 20, and the wavelength converter 13, which generates fourth harmonic. In addition, one or more optical pulse stretchers that are not shown may be disposed in the optical path of each of the laser oscillators 41, 42, and 43.

The highly reflective mirror 71 and the knife-edge mirror 81 are disposed in the optical path of a first pulse laser beam PL1 outputted from the laser oscillator 41. The highly reflective mirror 71 is disposed so as to reflect the first pulse laser beam PL1 and cause the reflected beam to be incident on the knife-edge mirror 81. The knife-edge mirror 81 is disposed so as to reflect the first pulse laser beam PL1 incident via the highly reflective mirror 71 and cause the optical path axis of the reflected first pulse laser beam PL1 to be parallel to the optical path axis of a second pulse laser beam PL2 outputted from the laser oscillator 42.

The highly reflective mirror 72 and the knife-edge mirror 82 are disposed in the optical path of a third pulse laser beam PL3 outputted from the laser oscillator 43. The highly reflective mirror 72 is disposed so as to reflect the third pulse laser beam PL3 and cause the reflected beam to be incident on the knife-edge mirror 82. The knife-edge mirror 82 is disposed so as to reflect the third pulse laser beam PL3 incident via the highly reflective mirror 72 and cause the optical path axis of the reflected third pulse laser beam PL3 to be parallel to the optical path axis of the second pulse laser beam PL2.

The first pulse laser beam PL1, the second pulse laser beam PL2, and the third pulse laser beam PL3 having traveled via the knife-edge mirrors 81 and 82 travel along the optical paths parallel to each other, and are partially reflected off the beam splitter 162 in the monitor module 16, pass through the condenser lens 163, and are incident on the photosensor 164.

The delay circuit 50 receives light emission delay periods at the laser oscillator 41, 42, and 43 from the laser controller 20D and outputs light emission trigger signals to the laser oscillators 41, 42, and 43 at light emission timings corresponding to the light emission delay periods.

The laser oscillator 41 is an example of the "first laser oscillator" in the present disclosure. The laser oscillator 42 is an example of the "second laser oscillator" in the present disclosure. The laser oscillator 43 is an example of the "third laser oscillator" in the present disclosure. The laser oscillators 41, 42, and 43 are denoted as a "laser oscillator 1", a "laser oscillator 2", and a "laser oscillator 3", respectively, in FIGS. 21 and 22.

7.2 Operation

Figure 22:
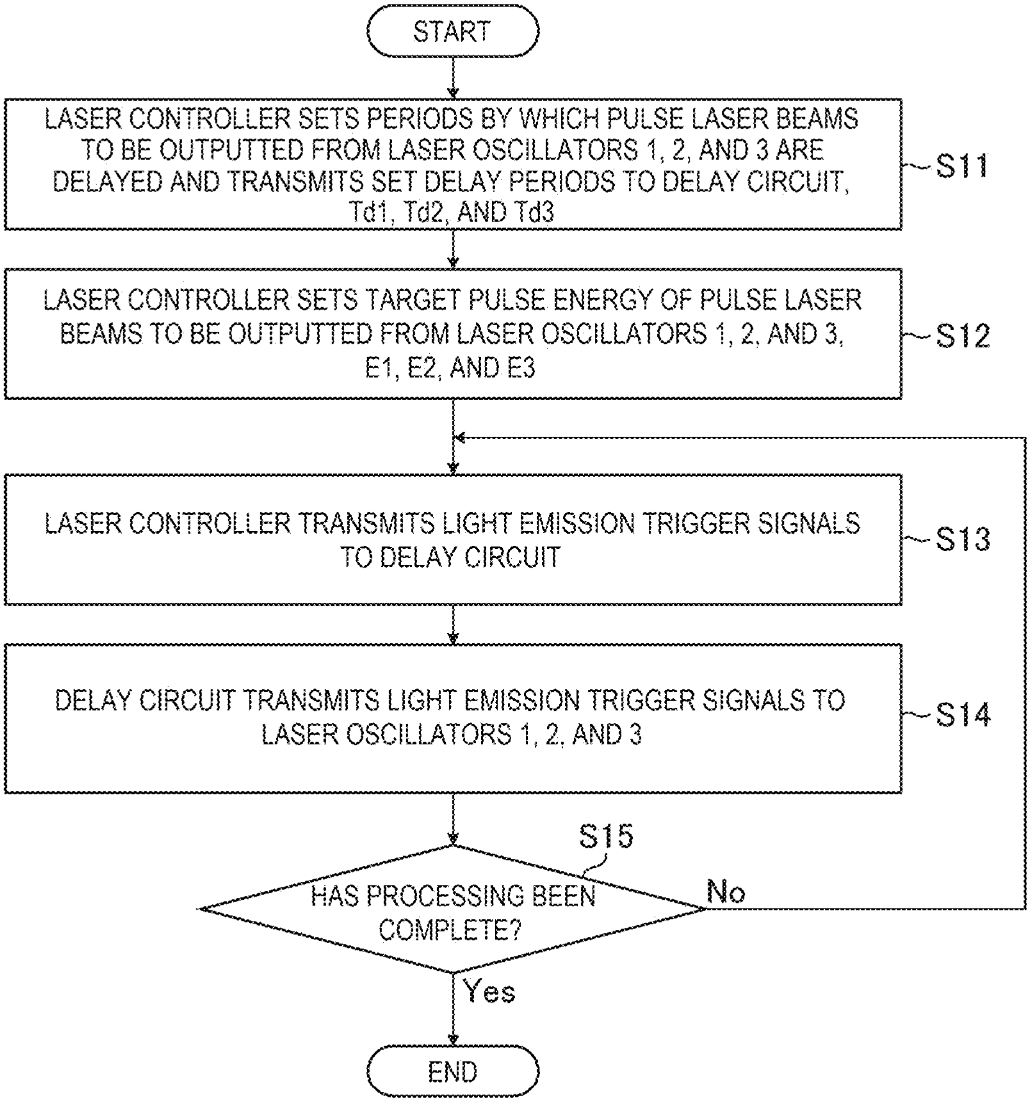
FIG. 22 is a flowchart showing an example of the operation of the laser system according to the fourth embodiment.

FIG. 22 is a flowchart showing an example of the operation of the laser system 10D. In step S11, the laser controller 20D sets the periods by which the pulse laser beams to be outputted from the plurality of laser oscillators 41, 42, and 43 are delayed and transmits the set delay periods to the delay circuit 50. Let Td1 be the delay period by which the first pulse laser beam PL1 is delayed (first delay period), Td2 be the delay period by which the second pulse laser beam PL2 is delayed (second delay period), and Td3 be the delay period by which the third pulse laser beam PL3 is delayed (third delay period), and the laser controller 20D sets, for example, as follows: Td1=30 ns; Td2=50 ns; and Td3=70 ns.

The laser controller 20D preferably sets the delay periods Td1, Td2, and Td3 in such a way that the energy ratio in the region from 5 ns after a pulse rises to 400 ns in the combined pulse laser beam that is the combination of the first pulse laser beam PL1, the second pulse laser beam PL2, and the third pulse laser beam PL3 is greater than or equal to 91% but smaller than or equal to 99%. The delay periods may be set so as to satisfy a relationship Td1<Td2<Td3.

Thereafter, in step S12, the laser controller 20D sets target pulse energy values of the pulse laser beams to be outputted from the plurality of laser oscillators 41, 42, and 43. Let E1 be the target pulse energy of the first pulse laser beam PL1 (first target pulse energy), E2 be the target pulse energy of the second pulse laser beam PL2 (second target pulse energy), and E3 be the target pulse energy of the third pulse laser beam PL3 (third target pulse energy), and the laser controller 20D sets, for example, as follows: E1=70 mJ; E2=100 mJ; and E3=100 mJ. The target pulse energy values may be set so as to satisfy a relationship E1<E2<E3.

Thereafter, in step S13, the laser controller 20D transmits the light emission trigger signals to the delay circuit 50.

Thereafter, in step S14, the delay circuit 50 transmits the light emission trigger signals to the laser oscillators 41, 42, and 43 in accordance with the delay period settings.

Thereafter, in step S15, the laser controller 20D evaluates whether the processing target object has been processed. When the result of the evaluation in step S15 is No, the laser controller 20D returns to step S13. On the other hand, when the result of the evaluation in step S15 is Yes, the laser controller 20D terminates the flowchart of FIG. 22.

Figure 23:
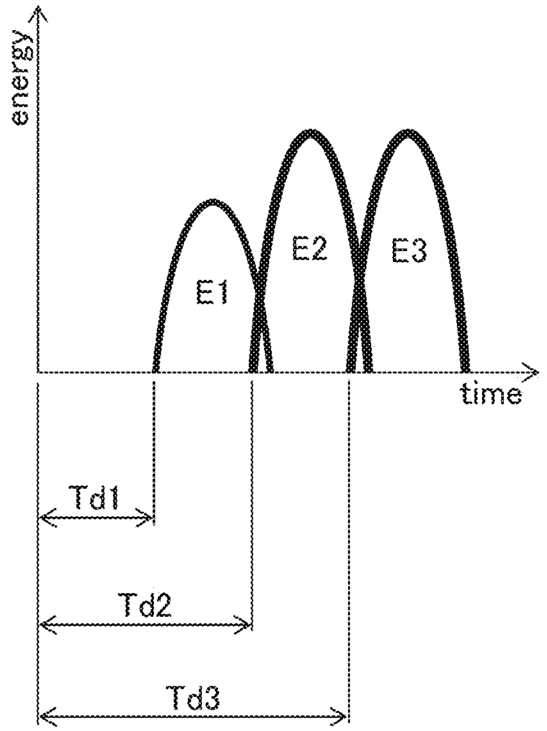
FIG. 23 describes delay periods by which the pulse laser beams outputted from a plurality of laser oscillators are delayed.

FIG. 23 describes the delay periods by which the pulse laser beams outputted from the plurality of laser oscillators 41, 42, and 43 in the laser system 10D are delayed. As examined with reference to FIGS. 10 to 12, when a microscopic hole is formed by irradiating the glass object GL with a plurality of pulses of the pulse laser beam, the state of the glass object GL is believed to be reset at the beginning of each of the pulses irradiated multiple times at a specific repetition frequency. It is therefore preferable that successive pulses of the plurality of pulse laser beams outputted at different timings from the plurality of laser oscillators 41, 42, and 43 partially overlap with each other so that the glass object GL is continuously irradiated with the subsequent pulses as the state in which the transmitted light quantity ratio associated with the glass object GL is small is not reset, as shown in FIG. 23. That is, the delay periods Td1, Td2, and Td3 are preferably so set that a subsequent pulse partially overlaps with a preceding pulse.

Figure 24:
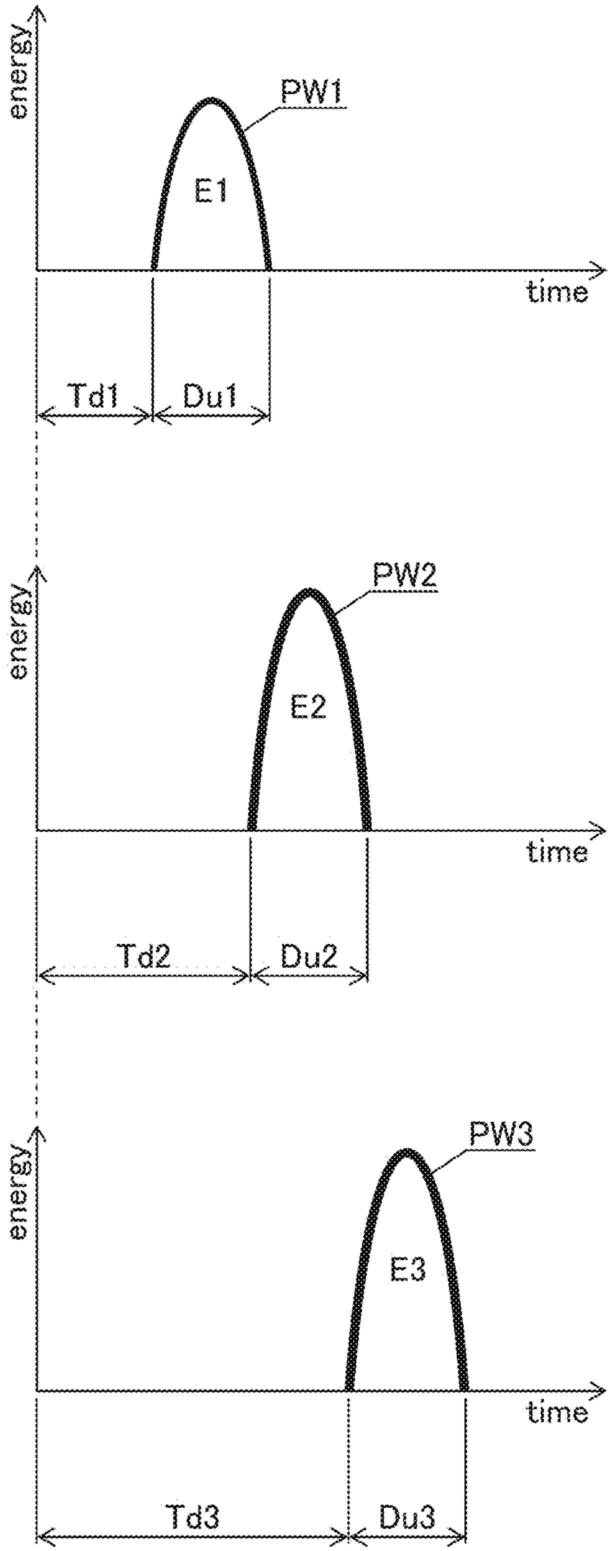
FIG. 24 shows examples of the pulse waveforms corresponding to one pulse of the pulse laser beams outputted from the plurality of laser oscillators.

FIG. 24 shows examples of the pulse waveforms corresponding to one pulse of the pulse laser beams outputted from the plurality of laser oscillators 41, 42, and 43. A pulse waveform PW1 shown in the upper portion of FIG. 24 is an example of the pulse waveform of the first pulse laser beam PL1 outputted from the laser oscillator 41. A pulse waveform PW2 shown in the middle portion of FIG. 24 is an example of the pulse waveform of the second pulse laser beam PL2 outputted from the laser oscillator 42. A pulse waveform PW3 shown in the lower portion of FIG. 24 is an example of the pulse waveform of the third pulse laser beam PL3 outputted from the laser oscillator 43.

The pulse waveform PW1 of the first pulse laser beam PL1 is an example of the "first pulse" in the present disclosure. The pulse waveform PW2 of the second pulse laser beam PL2 is an example of the "second pulse" in the present disclosure. The pulse waveform PW3 of the third pulse laser beam PL3 is an example of the "third pulse" in the present disclosure.

Let Du1 be the pulse duration from the rise to fall of the pulse in the pulse waveform PW1 of the first pulse laser beam PL1, Du2 be the pulse duration from the rise to fall of the pulse in the pulse waveform PW2 of the second pulse laser beam PL2, and Du3 be the pulse duration from the rise to fall of the pulse in the pulse waveform PW3 of the third pulse laser beam PL3, and the following relationship is preferably satisfied.

$$Td2<(Td1+Du1)$$

$$Td3<(Td2+Du2)$$

As described above, when a subsequent pulse of a plurality of successive pulses partially overlaps with a preceding pulse, the entire combined waveform of the combination of the plurality of pulses can generate a combined pulse laser beam having a pulse duration Td3+Du3−Td1. According to the contents described above with reference to FIGS. 6 to 12, TIS of the combined pulse laser beam is preferably greater than or equal to 62 ns. It is further preferable to satisfy Du1>5 ns and Td2−Td1>5 ns.

The combined pulse laser beam produced by combining the pulse waveforms PW1, PW2, and PW3 with one another at the knife-edge mirrors 81 and 82 is an example of the "combined pulse laser beam" in the present disclosure.

7.3 Effects

The laser system 10D according to the fourth embodiment, which combines the plurality of pulse laser beams outputted from the plurality of laser oscillators 41, 42, and 43, can generate a combined pulse laser beam having the energy ratio greater than or equal to 91% but smaller than or equal to 99% in the region from 5 ns after a pulse rises to 400 ns, whereby the same effects as those provided in the first to third embodiments can be provided.

8. Example of Preferable Conditions for Pulse Laser Beam

As described in the first to fourth embodiments, a preferable range of TIS of the pulse laser beam is greater than or equal to 62 ns but smaller than or equal to 259 ns, more preferably, greater than or equal to 62 ns but smaller than or equal to 155 ns, still more preferably, greater than or equal to 62 ns but smaller than or equal to 74 ns.

The preferable range of the energy ratio in the region from 5 ns after a pulse rises to 400 ns is greater than or equal to 91% but smaller than or equal to 99%, more preferably, greater than or equal to 91% but smaller than or equal to 95%.

9. Wavelength of Pulse Laser Beam

It has been ascertained that the processing rate is improved by setting the energy ratio in the region from 5 ns after a pulse rises to 400 ns for the pulse laser beams having wavelengths ranging from 248 nm to 266 nm at a value greater than or equal to 91% as described above.

On the other hand, when an ArF excimer laser apparatus (wavelength: 193 nm) is used, no significant change in the processing rate has been observed even when the pulse width (TIS) is changed.

In the wavelength range shorter than 248 nm or longer than 266 nm, it is speculated that there may be wavelengths at which improvement in the processing rate is expected as the wavelengths from 248 nm to 266 nm, but the wavelength conditions at such wavelengths have not empirically been ascertained.

To the present inventor's current knowledge, it is believed that a unique phenomenon occurs at least under the condition where alkali-free glass is irradiated for processing with a pulse laser beam having a wavelength ranging from 248 nm to 266 nm, including a representative pulse laser beam from a KrF excimer laser apparatus (wavelength of 248 nm). Based on the novel findings described above, the technology according to the present disclosure achieves improvement in the processing rate by using a pulse laser beam having a specific wavelength range (248 nm to 266 nm).

10. Hardware Configuration of Laser Controller

The laser controllers 20 and 20D can each be realized by using one or more processors. The processor is a processing apparatus including a storage device that stores a control program and a CPU (central processing unit) that executes the control program. The processor is particularly configured or programmed to carry out a variety of processes described in the present disclosure.

The storage device is a tangible, non-transitory computer readable medium, including, for example, a memory that is a primary storage device and a storage that is an auxiliary storage device. The computer readable medium may, for example, be a semiconductor memory, a hard disk drive (HDD) device, or a solid state drive (SSD) device, or a combination of a plurality of the components described above. The program to be executed by the processor is stored in the computer readable medium.

Part of the processing functions of the laser controllers 20 and 20D may be achieved by using an integrated circuit represented by an FPGA (field programmable gate array) and an ASIC (application specific integrated circuit).

11. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. A glass processing method comprising:

generating a pulse laser beam by using a laser oscillator; and irradiating alkali-free glass to be processed with the pulse laser beam, a wavelength of the pulse laser beam ranging from 248 nm to 266 nm, the pulse laser beam having an energy ratio greater than or equal to 91% but smaller than or equal to 99% in a region from 5 ns after a pulse rises to 400 ns, and the energy ratio is a ratio of energy in the region from 5 ns after the pulse rises to 400 ns to pulse energy in a region up to 400 ns including a period from a rise of the pulse laser beam to a fall.

2. The glass processing method according to claim 1, wherein the laser oscillator is a KrF excimer laser apparatus.

3. The glass processing method according to claim 1, wherein let I(t) be optical intensity of a temporal waveform of the pulse laser beam at time t, and a pulse width defined by $TIS=[\int I(t)\,dt]^2/\int I(t)^2 dt$ is greater than or equal to 62 ns but smaller than or equal to 259 ns.

4. The glass processing method according to claim 1, wherein the energy ratio of the pulse laser beam in the region from 5 ns after a pulse rises to 400 ns is greater than or equal to 91% but smaller than or equal to 95%.

5. The glass processing method according to claim 1, wherein the alkali-free glass is processed to form a through hole by irradiating the alkali-free glass with the pulse laser beam multiple times.

* * * * *